US006971806B2

(12) United States Patent
Wessells et al.

(10) Patent No.: US 6,971,806 B2
(45) Date of Patent: Dec. 6, 2005

(54) APPARATUS, METHOD, AND COMPUTER PROGRAM PRODUCT FOR PAD TRANSFER

(76) Inventors: Philip G. Wessells, 123 Cascade Dr., Mill Valley, CA (US) 94941; Michael Simonian, 417 42nd Ave., San Francisco, CA (US) 94121; James R. Yurchenco, 4102 Sutherland Dr., Palo Alto, CA (US) 94303; Larry Cheng, 723 Holly Oak Dr., Palo Alto, CA (US) 94303; Jesse Fourt, 663 11th Ave., Menlo Park, CA (US) 94025; Chris Luomanen, 1670 Alabama St., San Francisco, CA (US) 94110; Shilajeet Banerjee, 2403 Read Ave., Belmont, CA (US) 94002; Sven James Newman, 3311 Alameda de las Pulgas, Menlo Park, CA (US) 94025; Opher Doron Yom-Tov, 1073 Carolina St., San Francisco, CA (US) 94107; Jon H. LeFors, 1828 Eddy St., San Francisco, CA (US) 94115; Hans-Christoph Haenlein, 1437 Bretmoor Way, San Jose, CA (US) 95129; Michael E. Woods, 112 Barn Rd., Tiburon, CA (US) 94920-2602

( * ) Notice: Subject to any disclaimer, the term of this patent is extended or adjusted under 35 U.S.C. 154(b) by 0 days.

(21) Appl. No.: 10/728,119

(22) Filed: Dec. 3, 2003

(65) Prior Publication Data

US 2005/0025555 A1 Feb. 3, 2005

Related U.S. Application Data

(63) Continuation-in-part of application No. 10/628,749, filed on Jul. 28, 2003.

(51) Int. Cl.$^7$ .......................... B41J 3/28; B41J 13/00; B41J 13/10; B65H 3/14; B65H 3/18
(52) U.S. Cl. ........................................ 400/48; 400/23
(58) Field of Search .......................... 400/23, 24, 27, 400/28, 29, 34, 36, 48, 88

(56) References Cited

U.S. PATENT DOCUMENTS 4,776,575 A * 10/1988 Mayer et al. .................. 271/33

(Continued)

FOREIGN PATENT DOCUMENTS

EP 0564297 A2 6/1993

(Continued)

OTHER PUBLICATIONS

Machine translation of JP 09058073 to Saka from Japanese Patent Office website.*

(Continued)

Primary Examiner—Daniel J. Colilla
(74) Attorney, Agent, or Firm—Patent Law Offices - MEW

(57) ABSTRACT

The present invention includes apparatus and method for image transfer onto one of a plurality of a pad medium pages while the pages are aggregated together. A preferred embodiment for a printer includes a housing; a print engine, within the housing, for transferring an image to a transfer medium when the transfer medium is located at a print position; and a transfer medium registration system, coupled to the print engine, for positioning a pad including a plurality of transfer media releasably secured to one another, wherein the print registration system locates one of the transfer media at the print position. The method including positioning a pad at a print position of a print transfer engine, the pad including a plurality of transfer media releasably secured to one another; and transferring an image to one of the transfer media positioned at the print position.

27 Claims, 21 Drawing Sheets

U.S. PATENT DOCUMENTS

| | | | |
|---|---|---|---|
| 5,248,207 A * | 9/1993 | Yamamoto et al. | 400/120.16 |
| 5,323,918 A * | 6/1994 | Fair | 221/36 |
| 5,503,384 A * | 4/1996 | Fukube | 271/18.2 |
| 5,583,783 A * | 12/1996 | Yasui | 700/213 |
| 5,634,730 A | 6/1997 | Bobry | |
| 6,357,939 B1 | 3/2002 | Baron | |
| 6,411,315 B1 * | 6/2002 | Young | 715/788 |
| 6,499,840 B2 | 12/2002 | Day et al. | |
| 6,517,266 B2 | 2/2003 | Saund | |
| 6,718,875 B2 * | 4/2004 | Ono | 101/477 |
| 2001/0017441 A1 * | 8/2001 | Yamaguchi et al. | 271/94 |
| 2001/0048832 A1 * | 12/2001 | Kaplan | 400/76 |
| 2002/0030830 A1 | 3/2002 | Day et al. | |
| 2003/0083967 A1 | 5/2003 | Fleming | |

FOREIGN PATENT DOCUMENTS

| | | | | |
|---|---|---|---|---|
| JP | 04144770 A * | 5/1992 | | B41J 29/00 |
| JP | 09058073 A * | 3/1997 | | B41J 13/00 |
| JP | 10039984 A * | 2/1998 | | G06F 3/03 |
| JP | 2001071567 | 3/2001 | | |
| JP | 2001312391 A * | 11/2001 | | G06F 3/12 |
| WO | WO 03/069453 A1 | 8/2003 | | |
| WO | WO 03/091032 A1 | 11/2003 | | |

OTHER PUBLICATIONS

G4TECHTV, Review: Sony DPP-MP1 Digital Photo Printer, Feb. 15, 2002 (http://www.g4techtv.com/freshgear/features/19392/Review_Sony_DPPMP1_Digital_Photo_Printer_pg 1.html).

Lisa Eccles, Digital Camera With Built-In Printer Looms On The Horizon, Jan. 22, 2001 (Electronic Design Web—http://www.elecdesign.com/Articles/Print.cfm?ArticleID=4262).

Revolutionary New Inkjet Technology Debuts in Canon U.S.A.'s N1000/N2000 Office Color Printers, Apr. 23, 2002 (http://www.businesswire.com/webbox/bw.042302/221132587.htm).

Blog Entry: Biz Stone—"Printer Idea" entry, Oct. 24, 2002 (http://www.bizstone.com/archive/2002_10_20_archive.htm).

Phoenix MAA, et al., Redesign and Retrospective: A Redesign of the Palm V, operating system, and related applications, May 1, 2002. (Publication information unavailable).

Printdreams, The RMPT™ white paper, Oct. 16, 2002 (http://www.printdreams.com/inside/whitepaper.pdf).

* cited by examiner

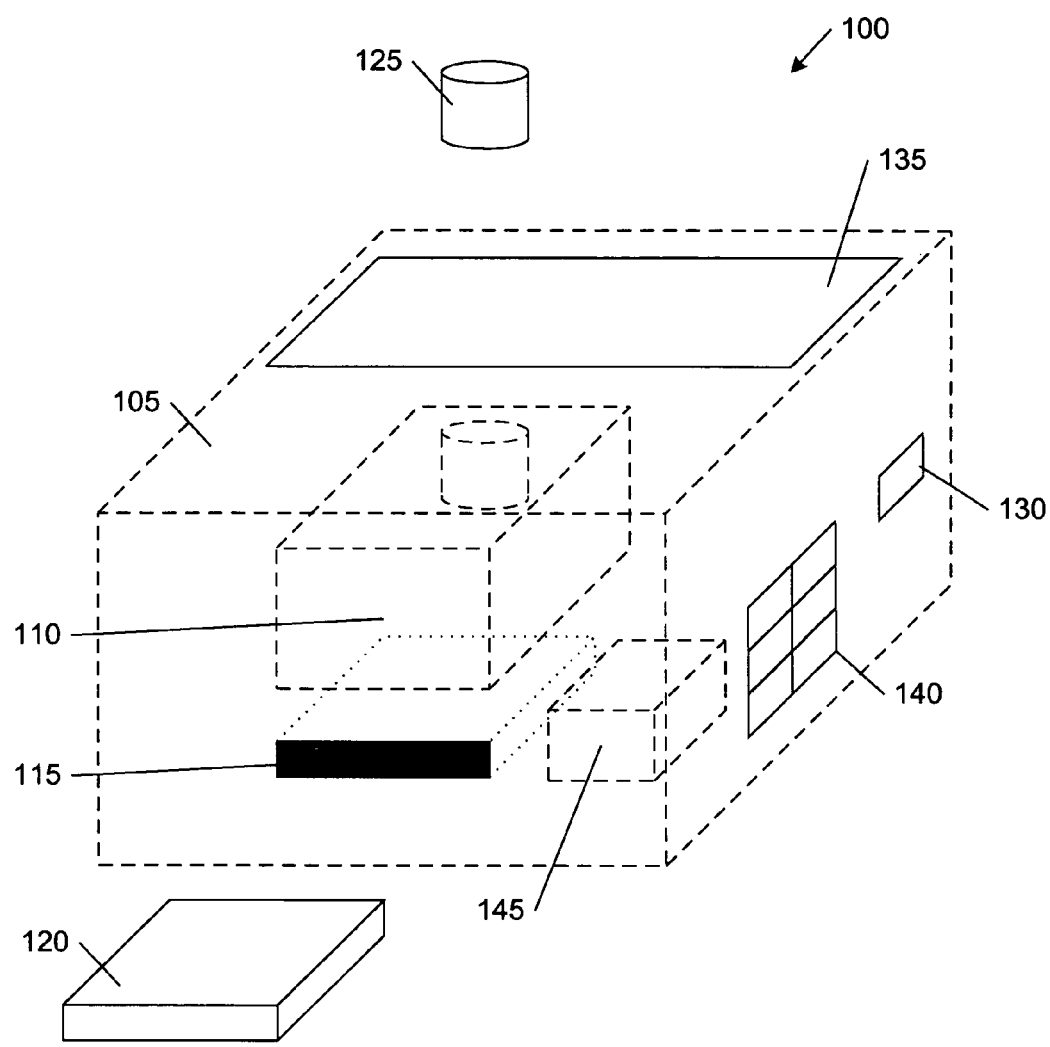
Figure_1

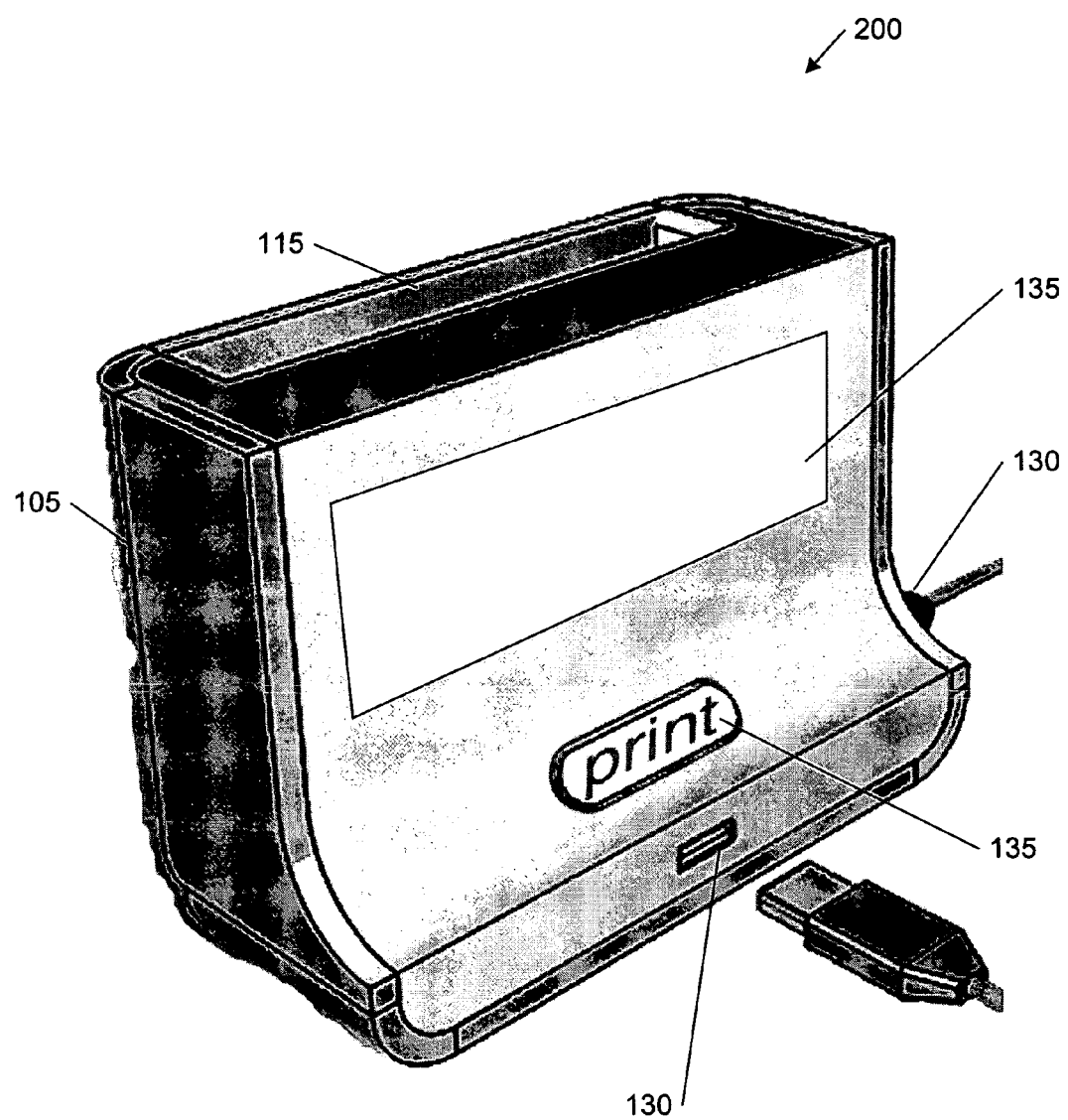
Figure_2

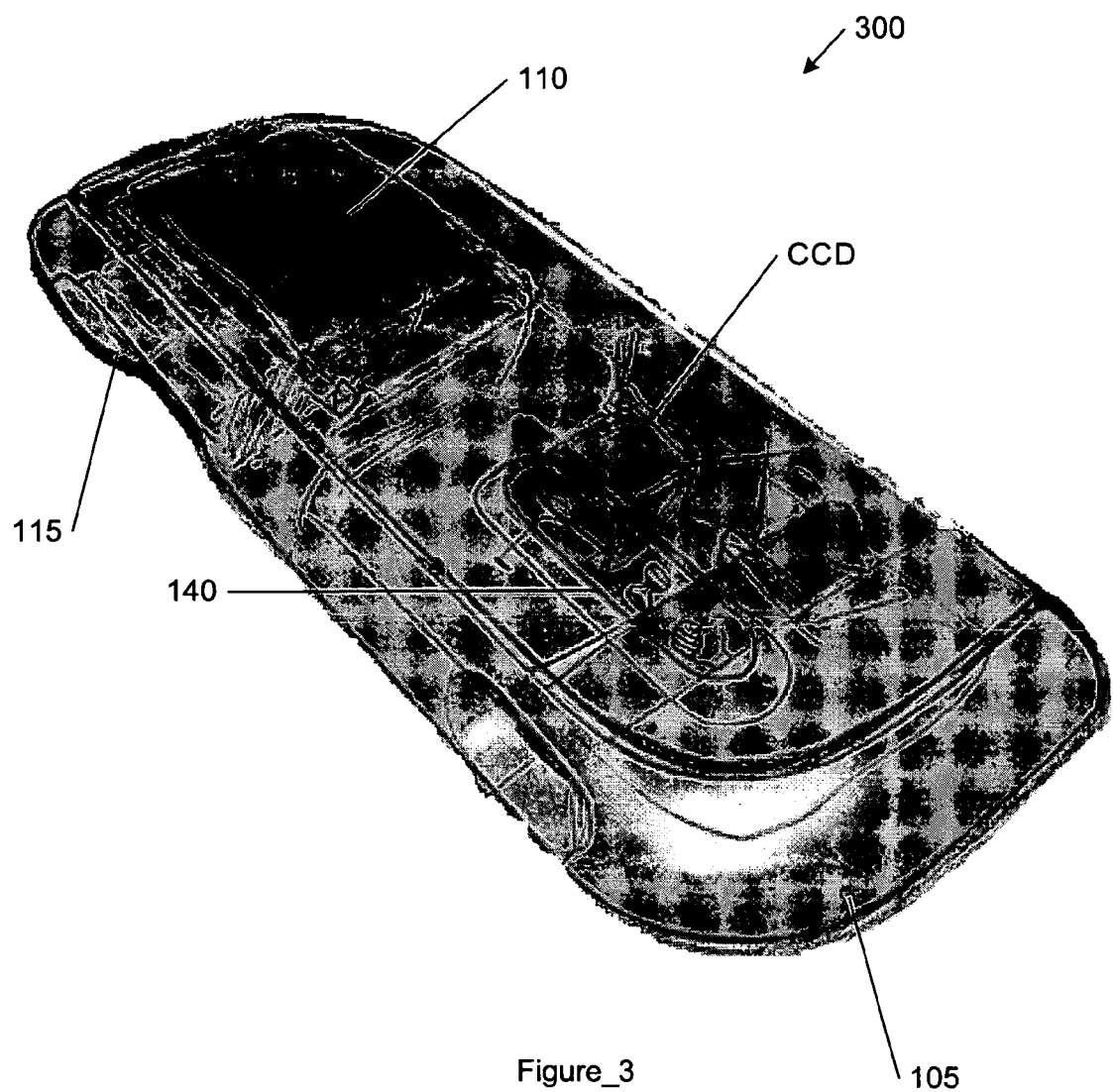
Figure_3

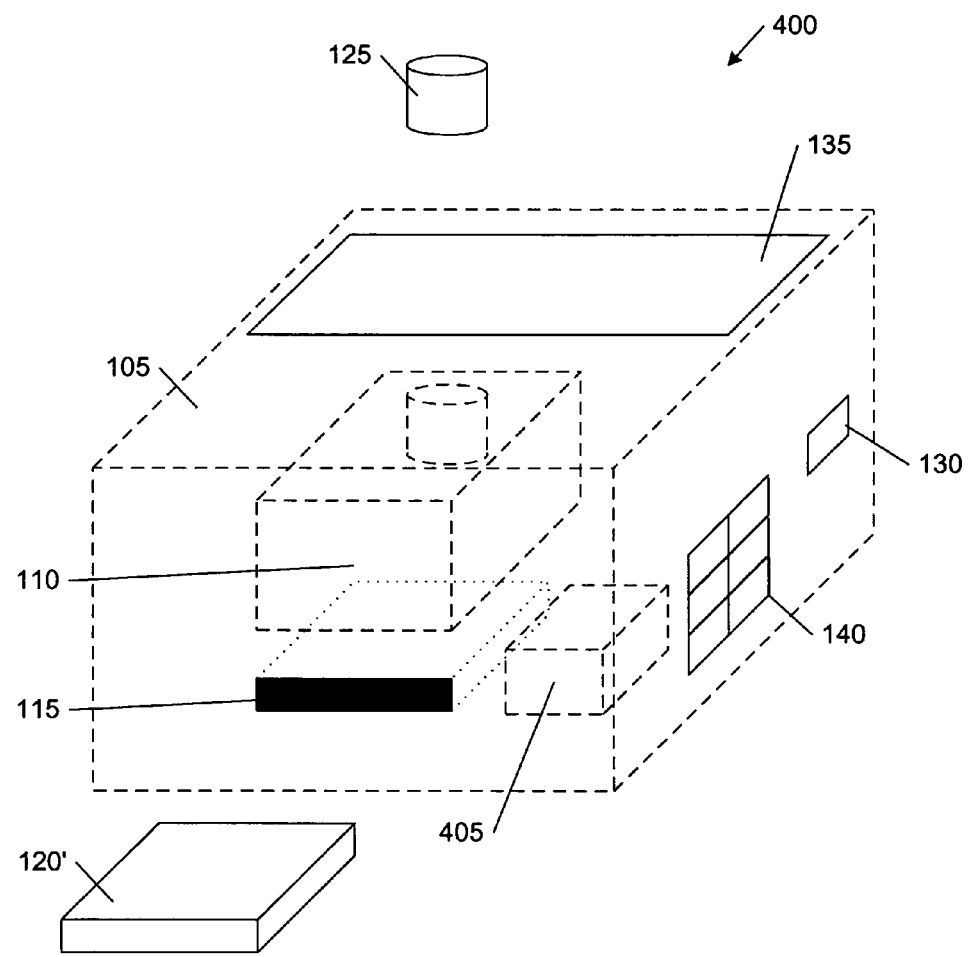
Figure_4

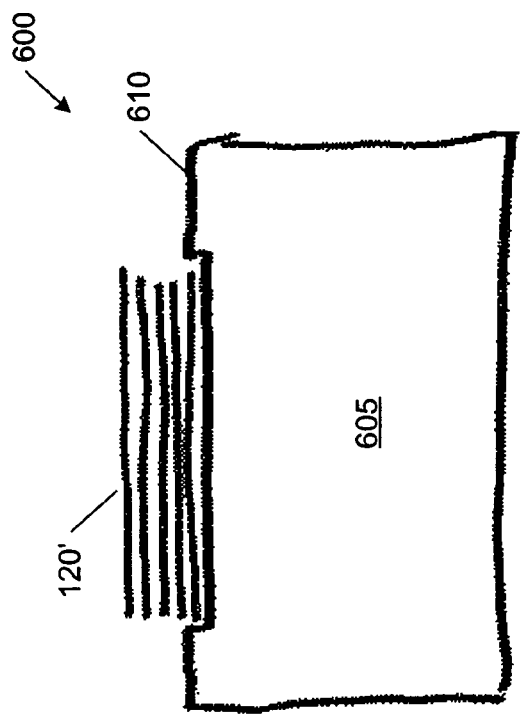
Figure_6
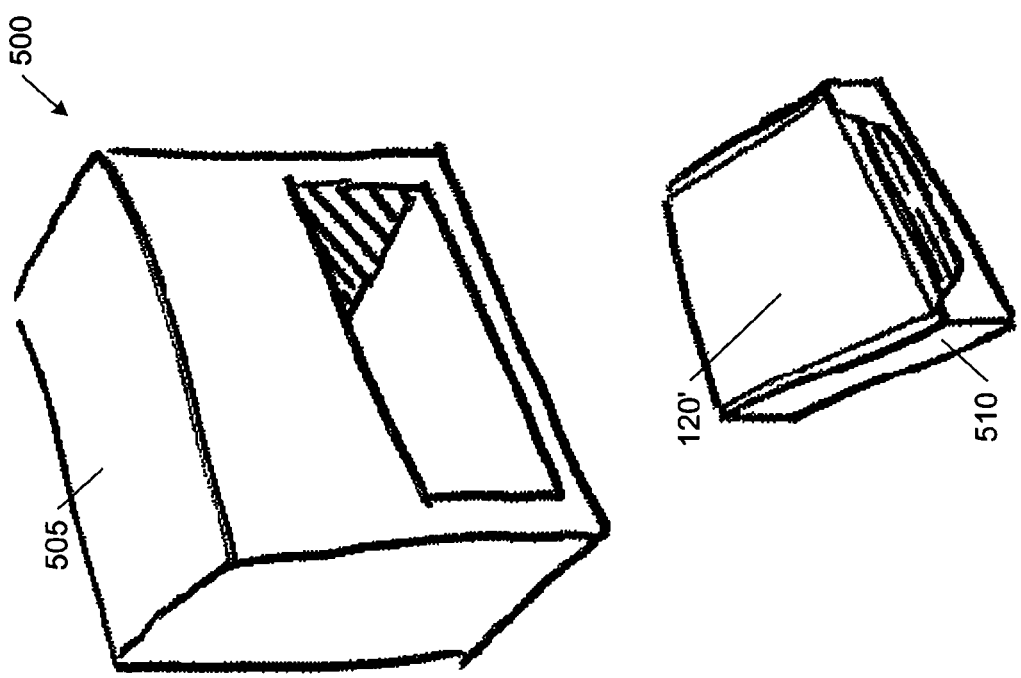
Figure_5

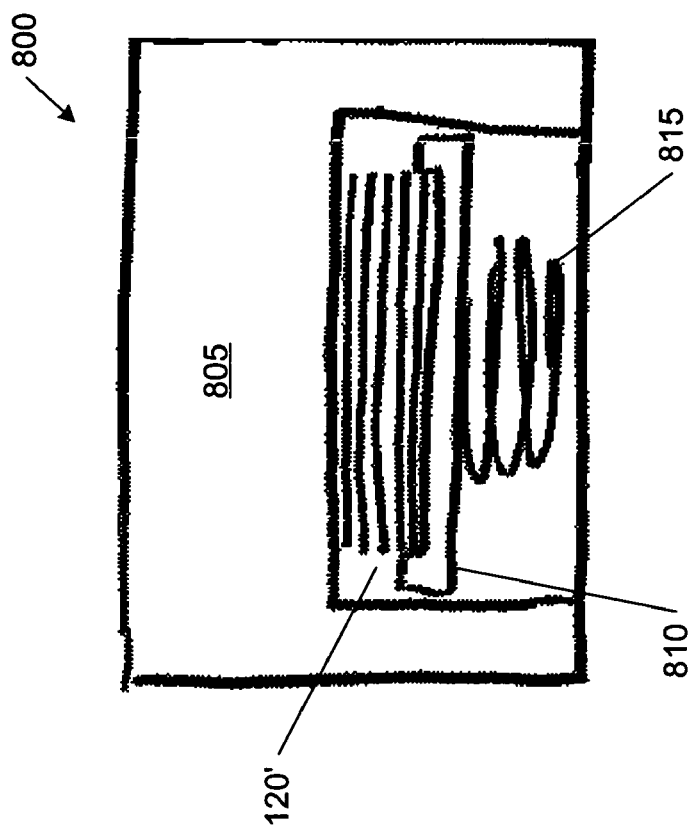
Figure_8
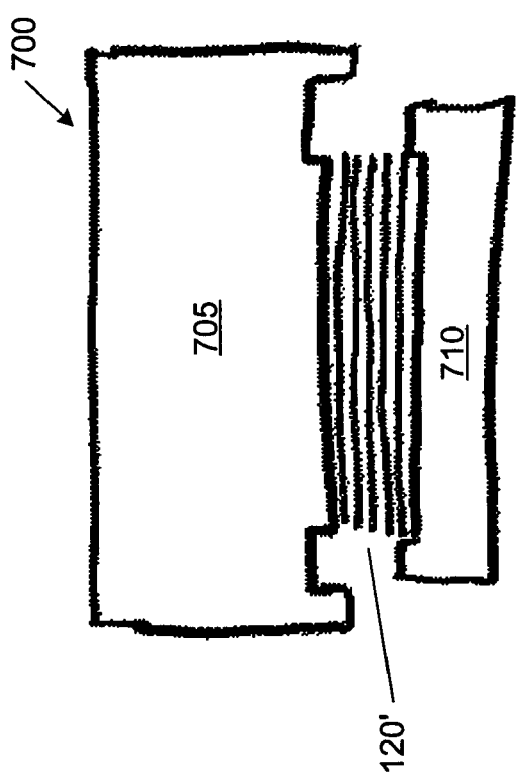
Figure_7

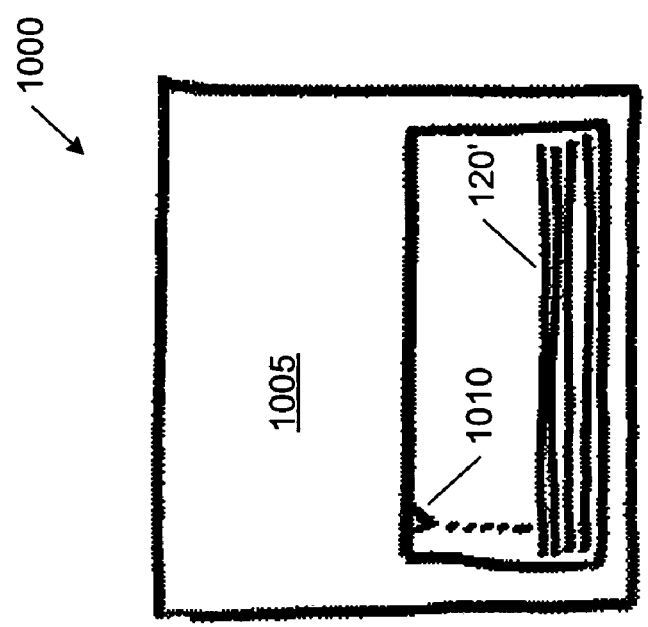
Figure_10
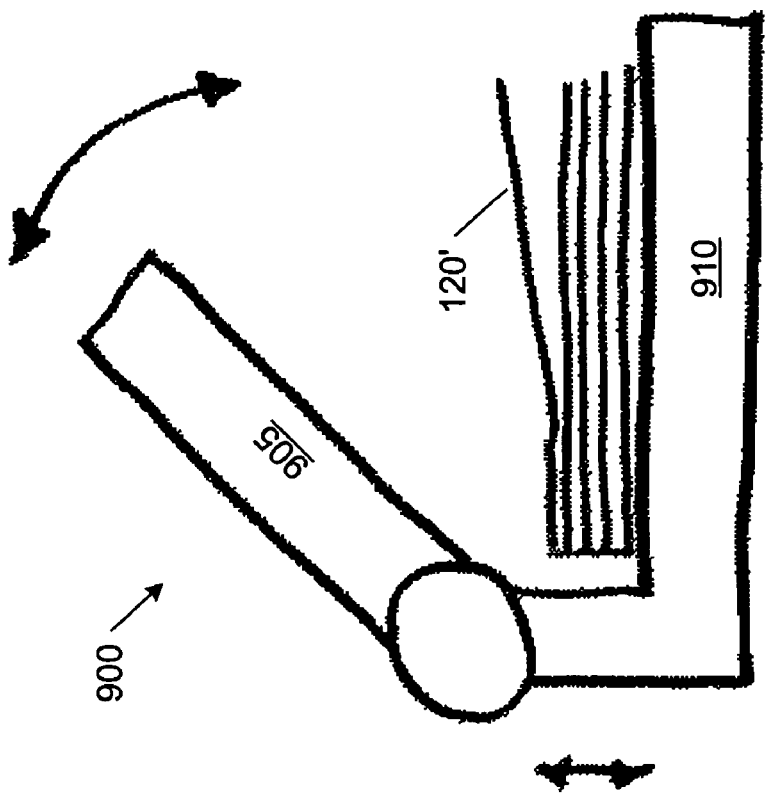
Figure_9

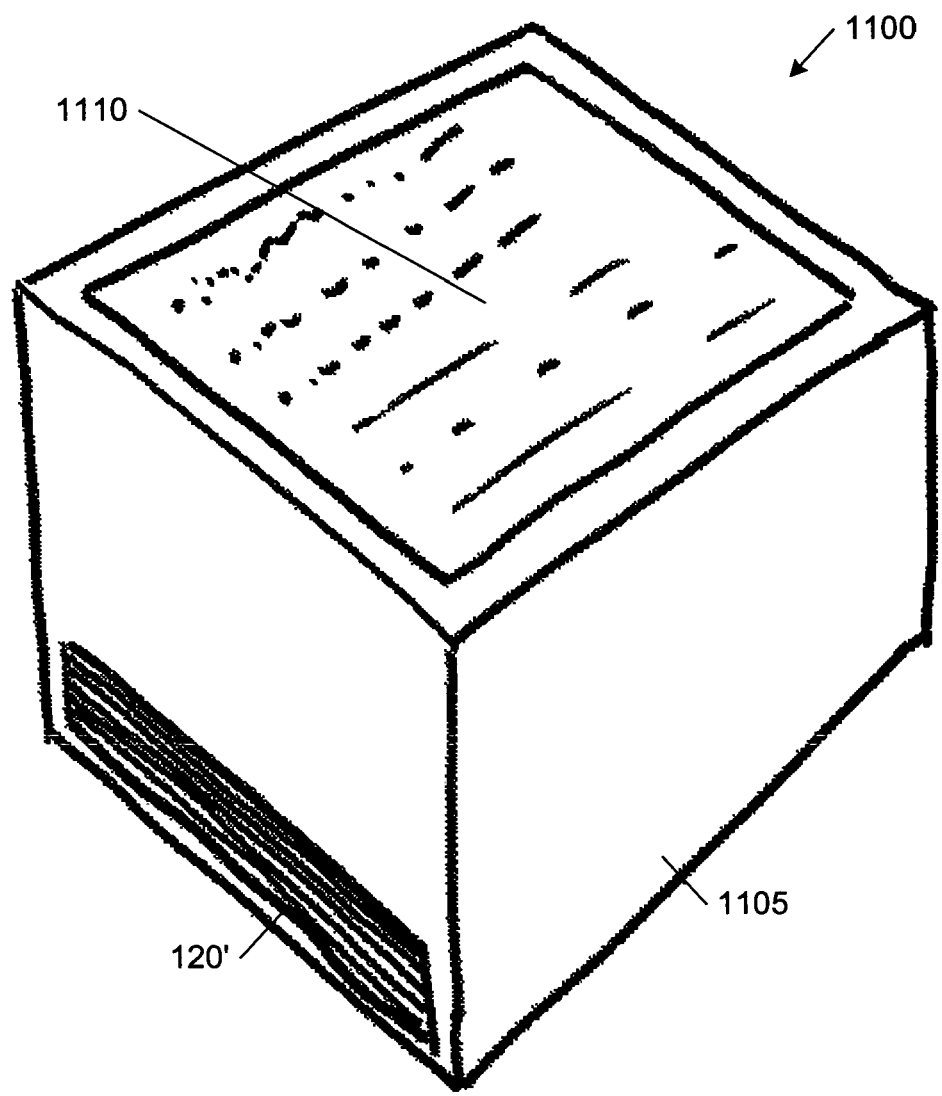
Figure_11

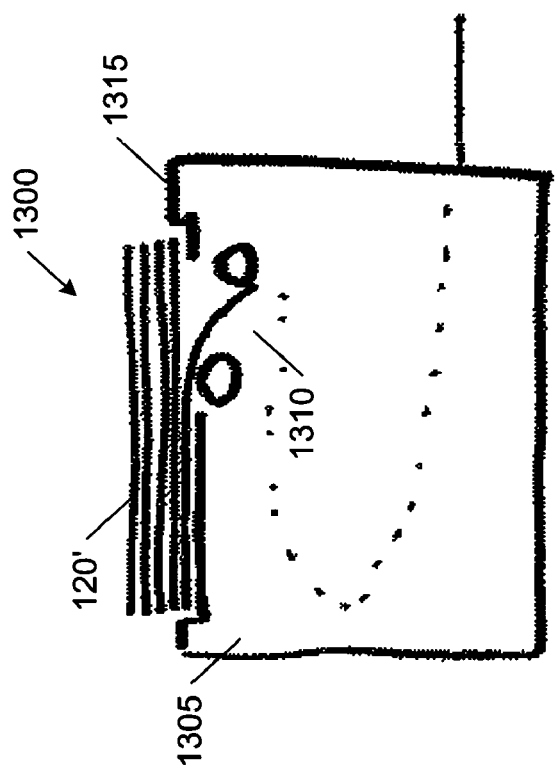
Figure_13
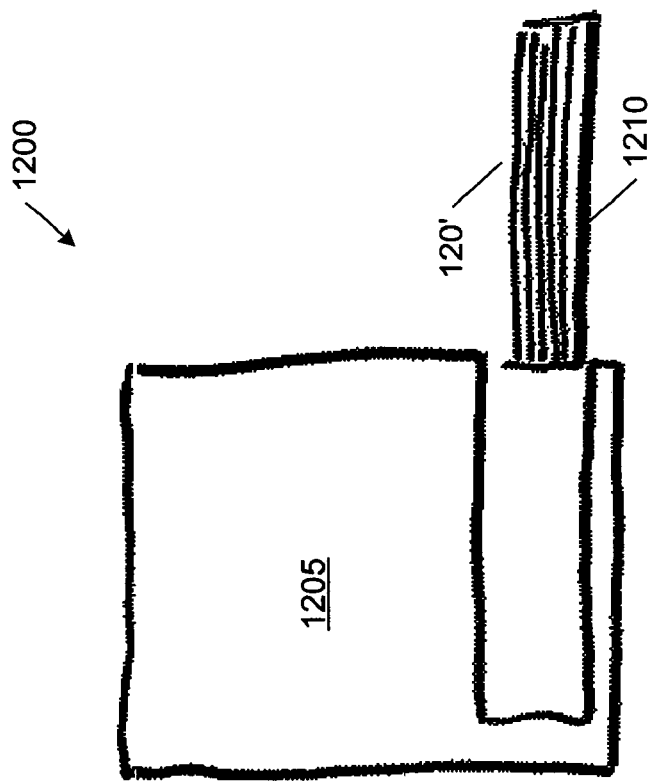
Figure_12

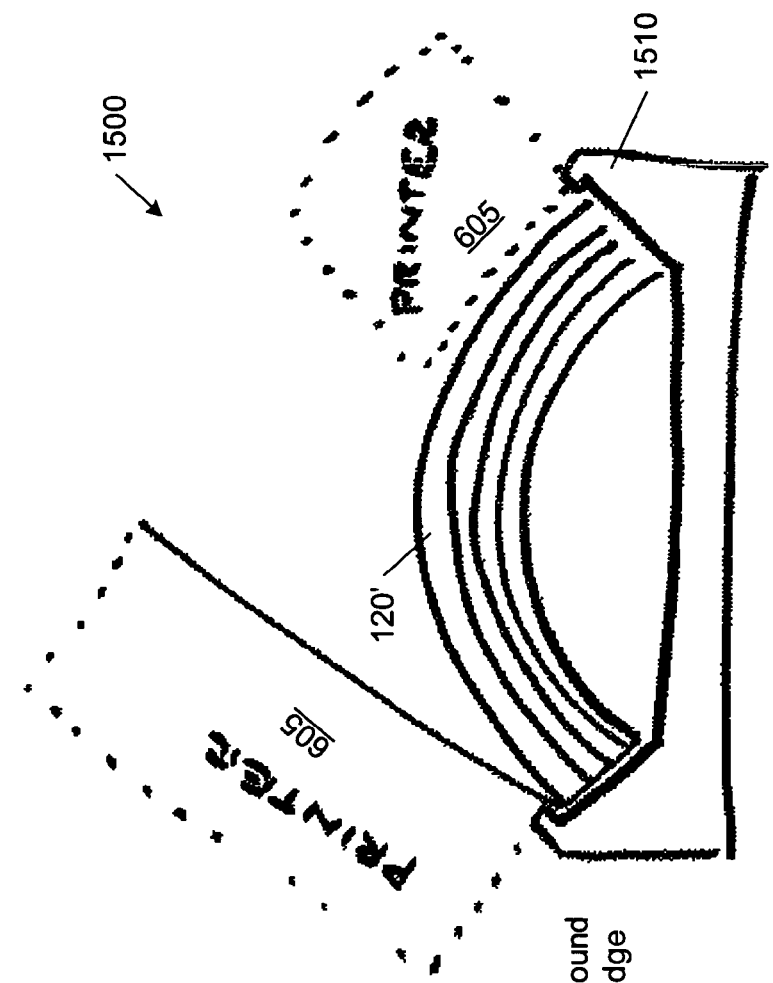
Figure_15
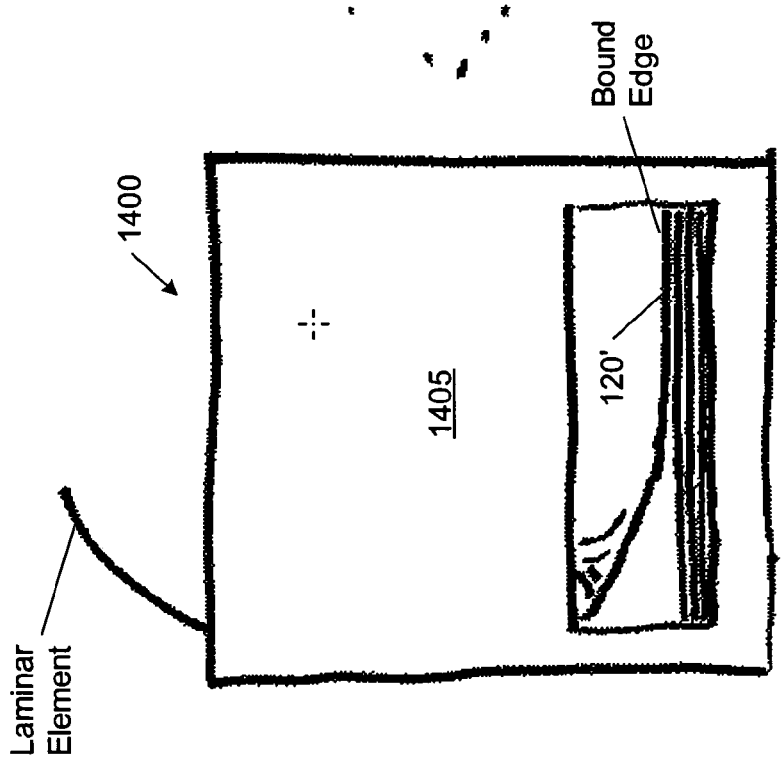
Figure_14

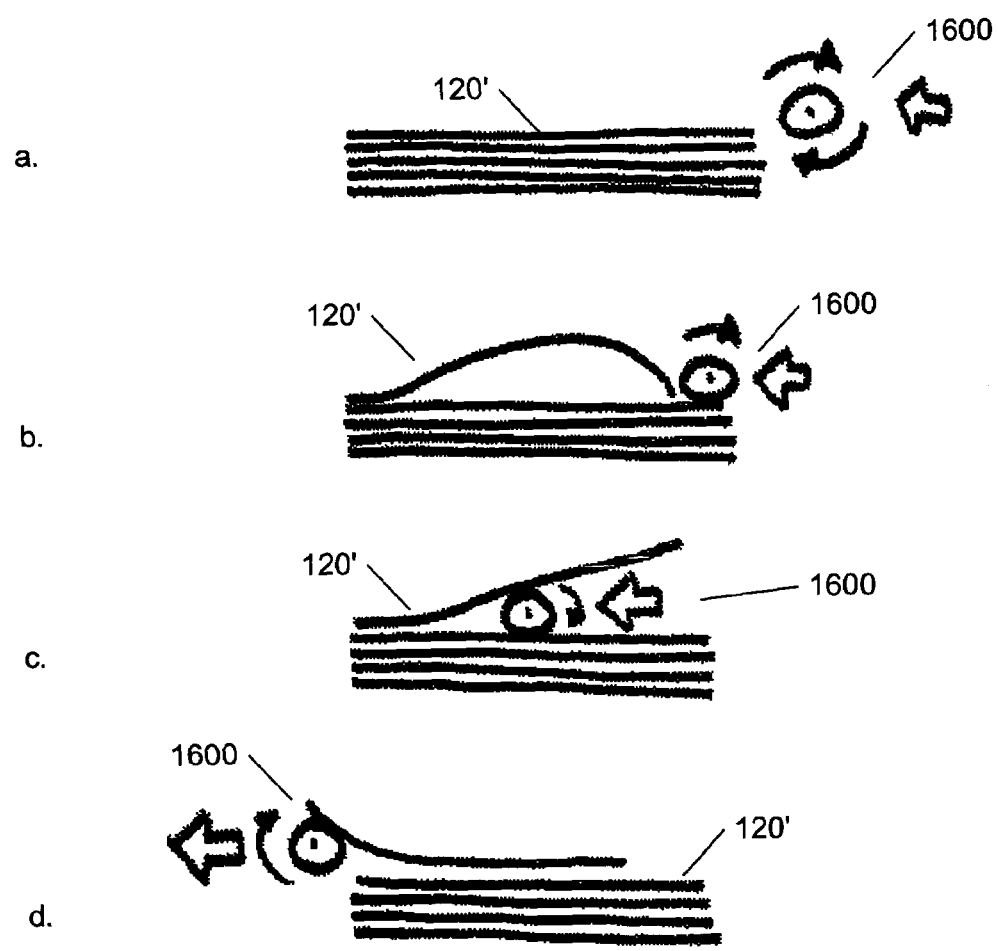
Figure_16

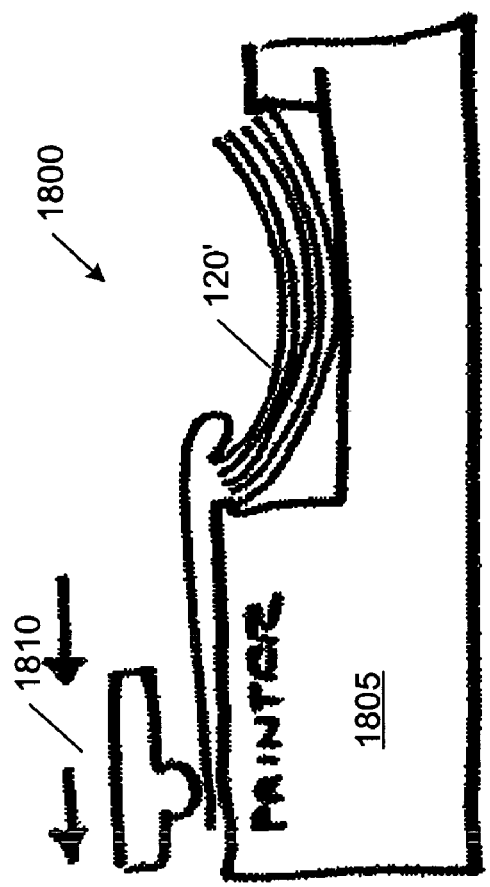
Figure_18
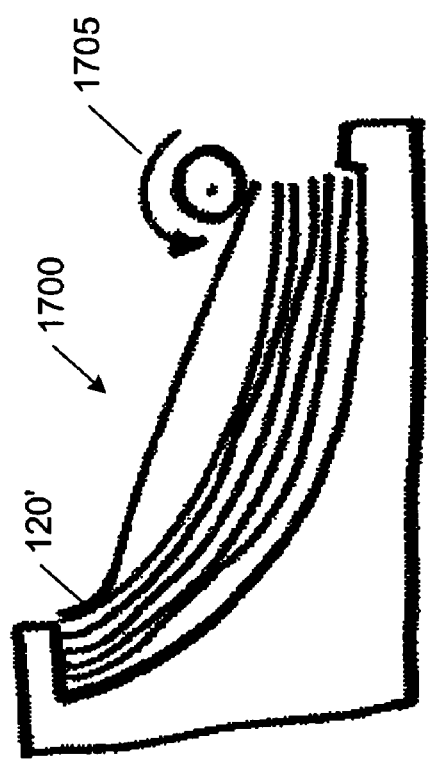
Figure_17

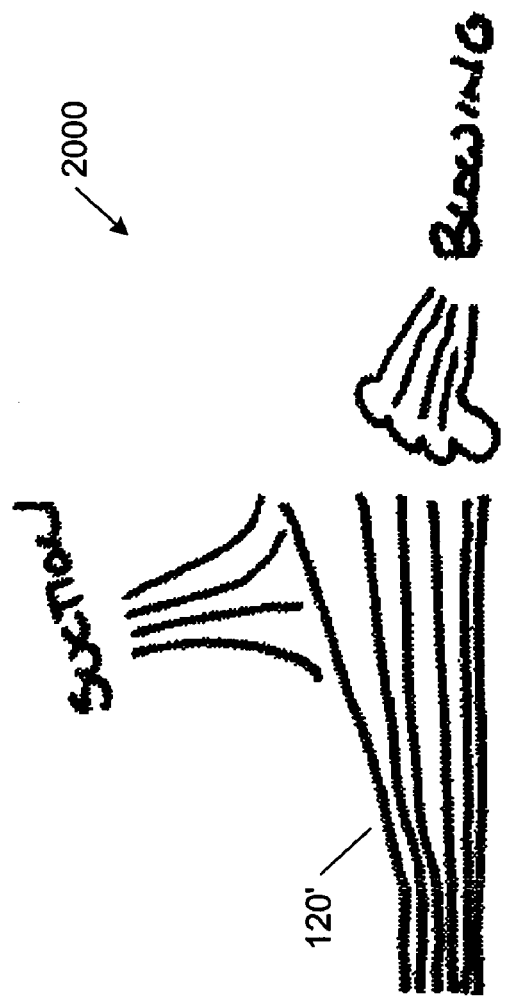
Figure_20
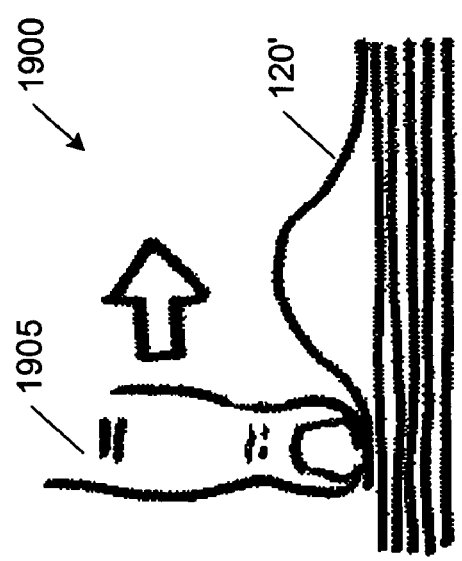
Figure_19

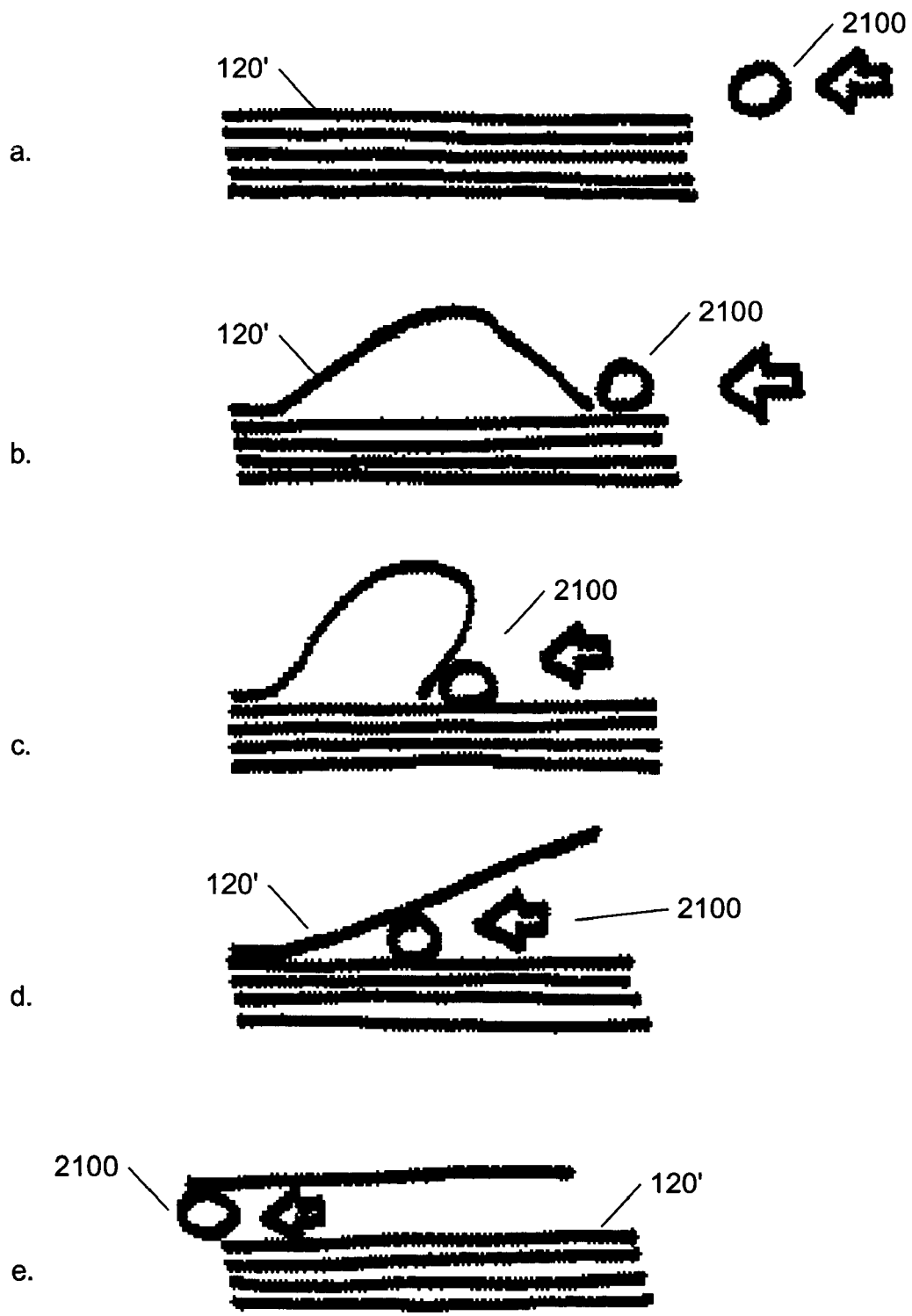
Figure_21

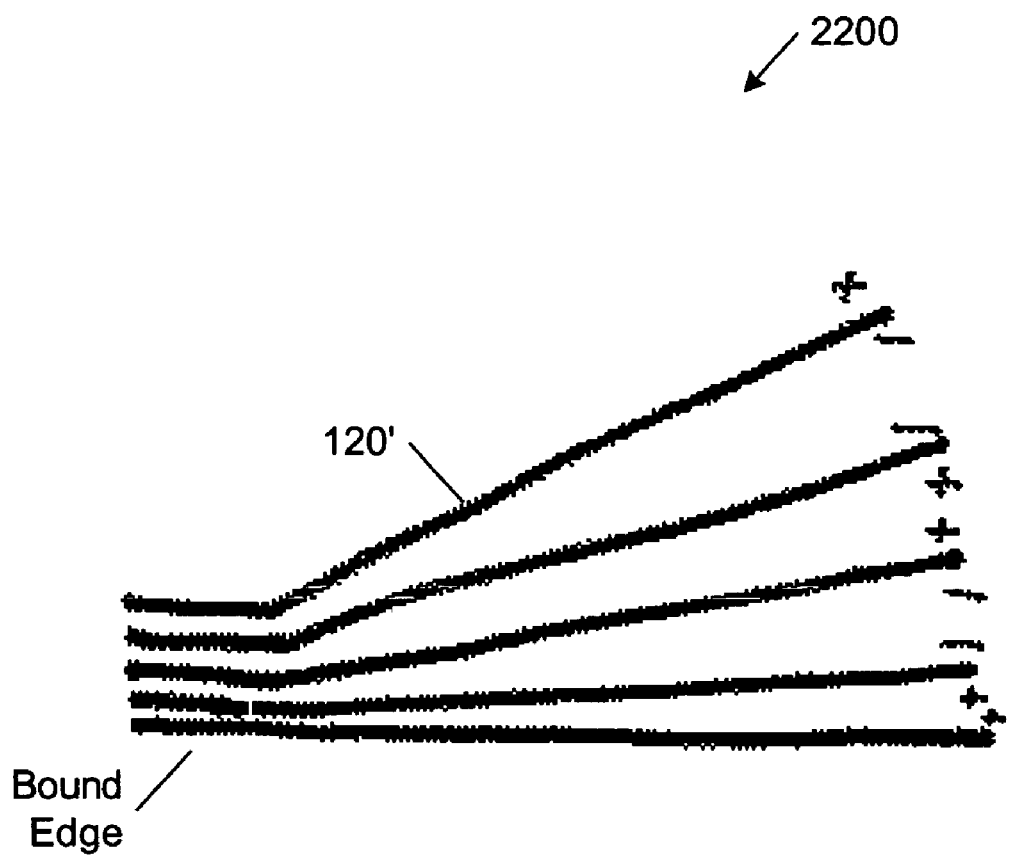
Figure_22

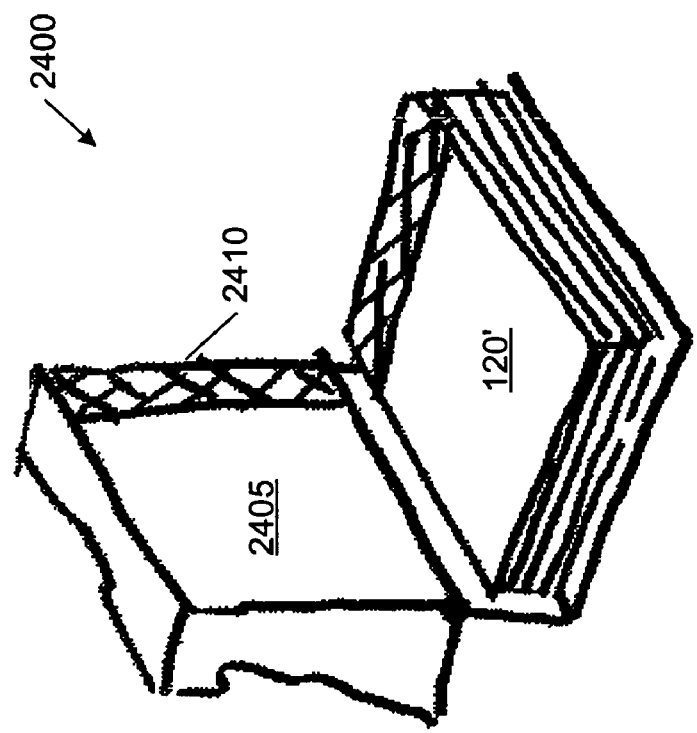
Figure_24
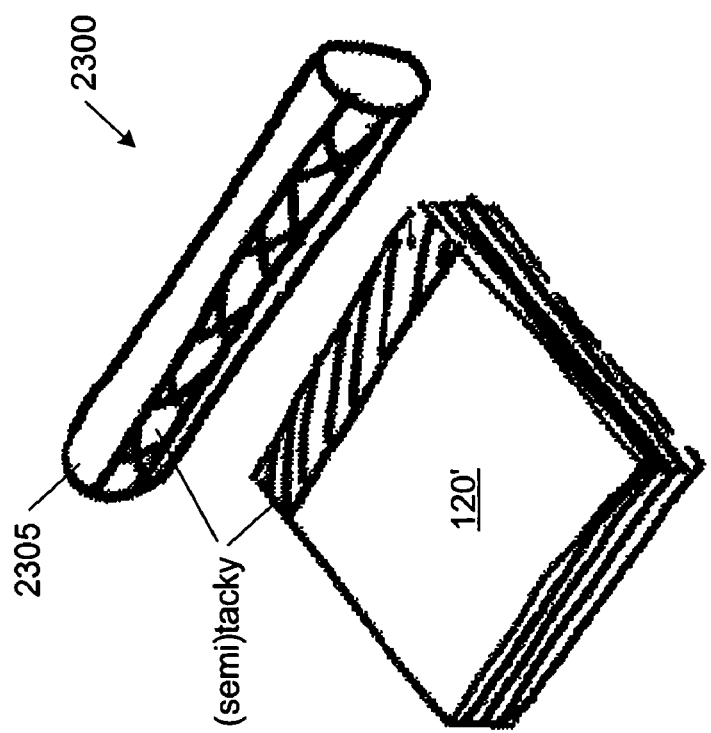
Figure_23

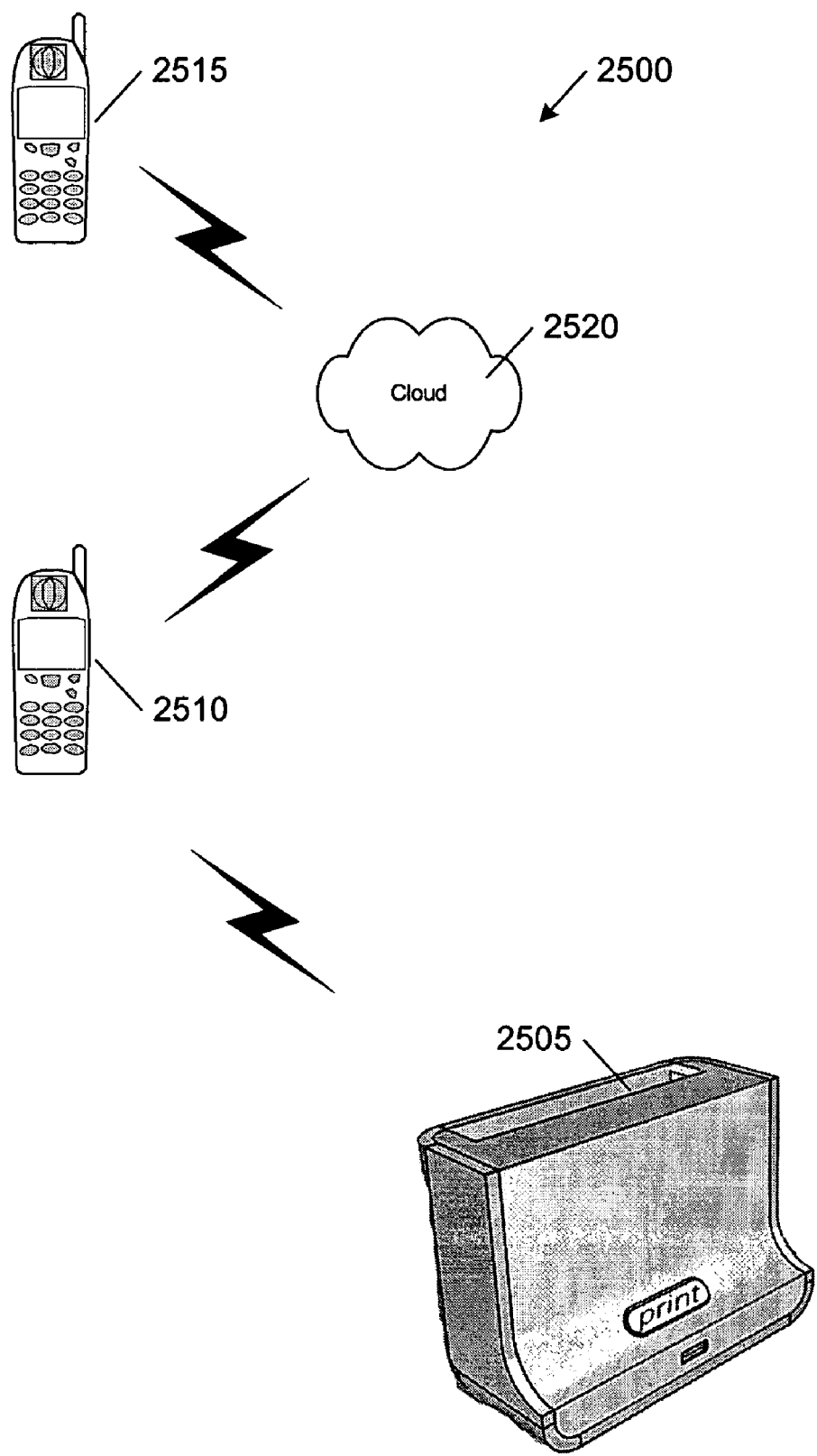
Figure_25

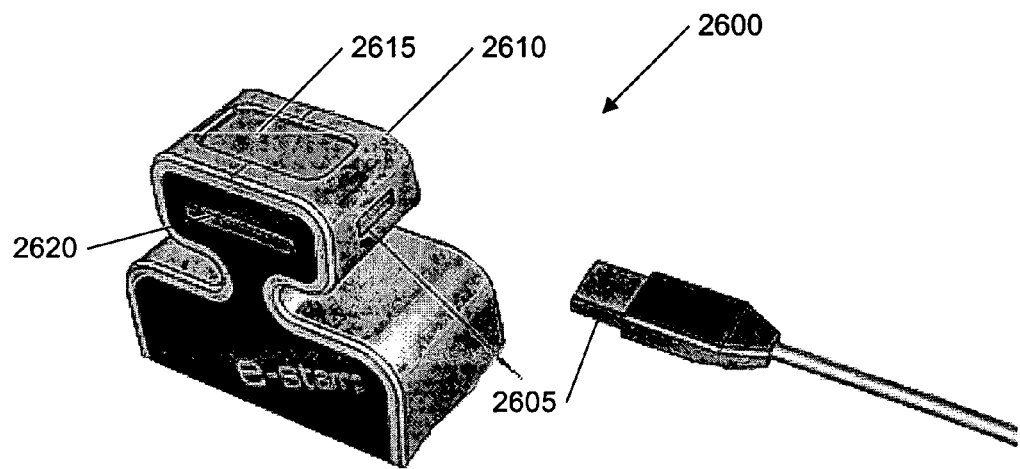
FIGURE_26
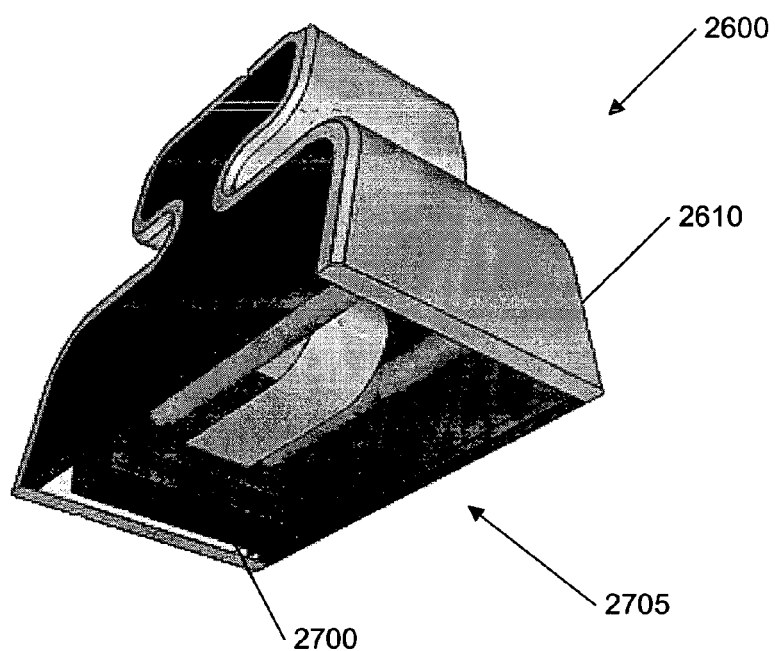
FIGURE_27

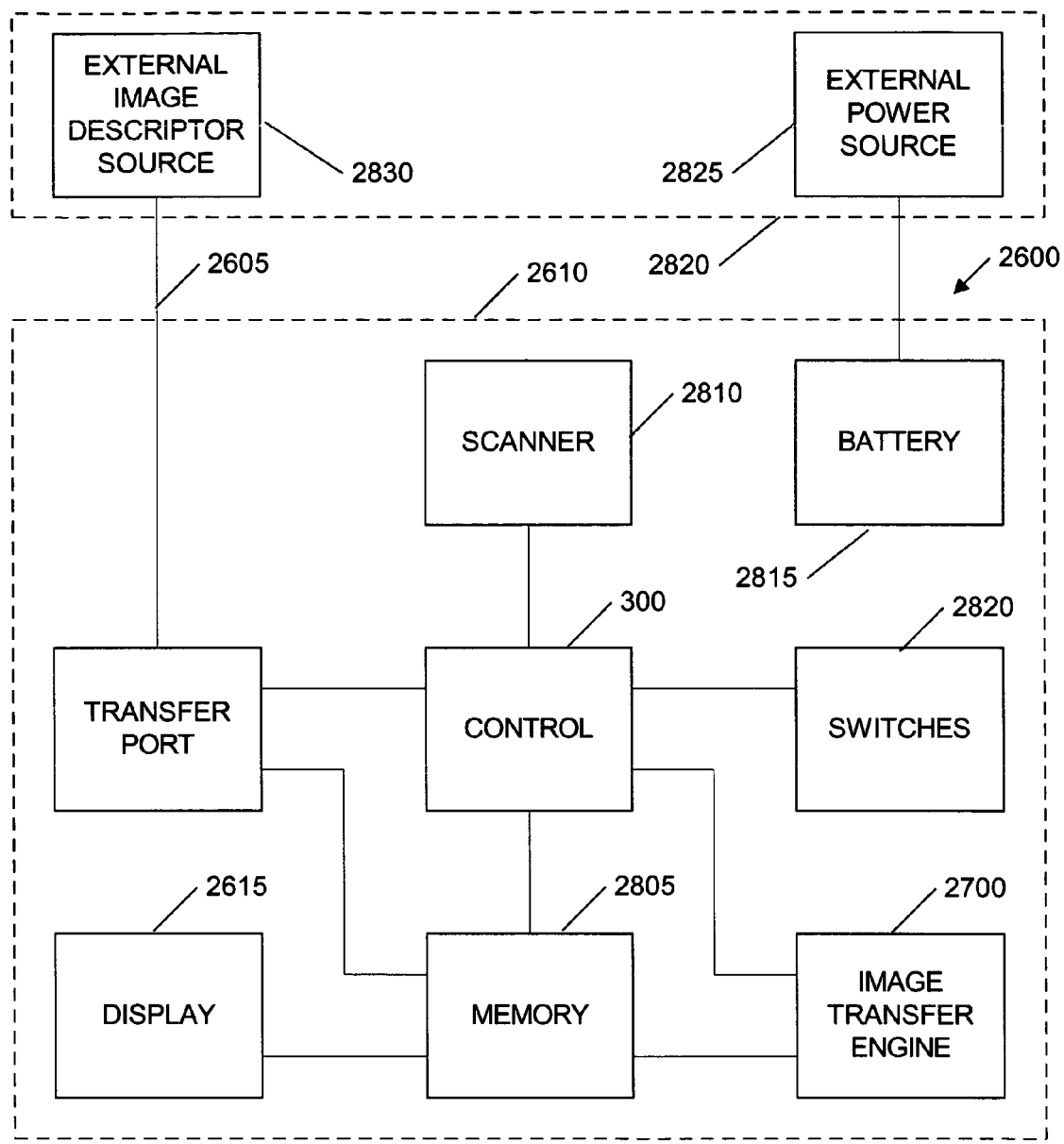
FIGURE_28

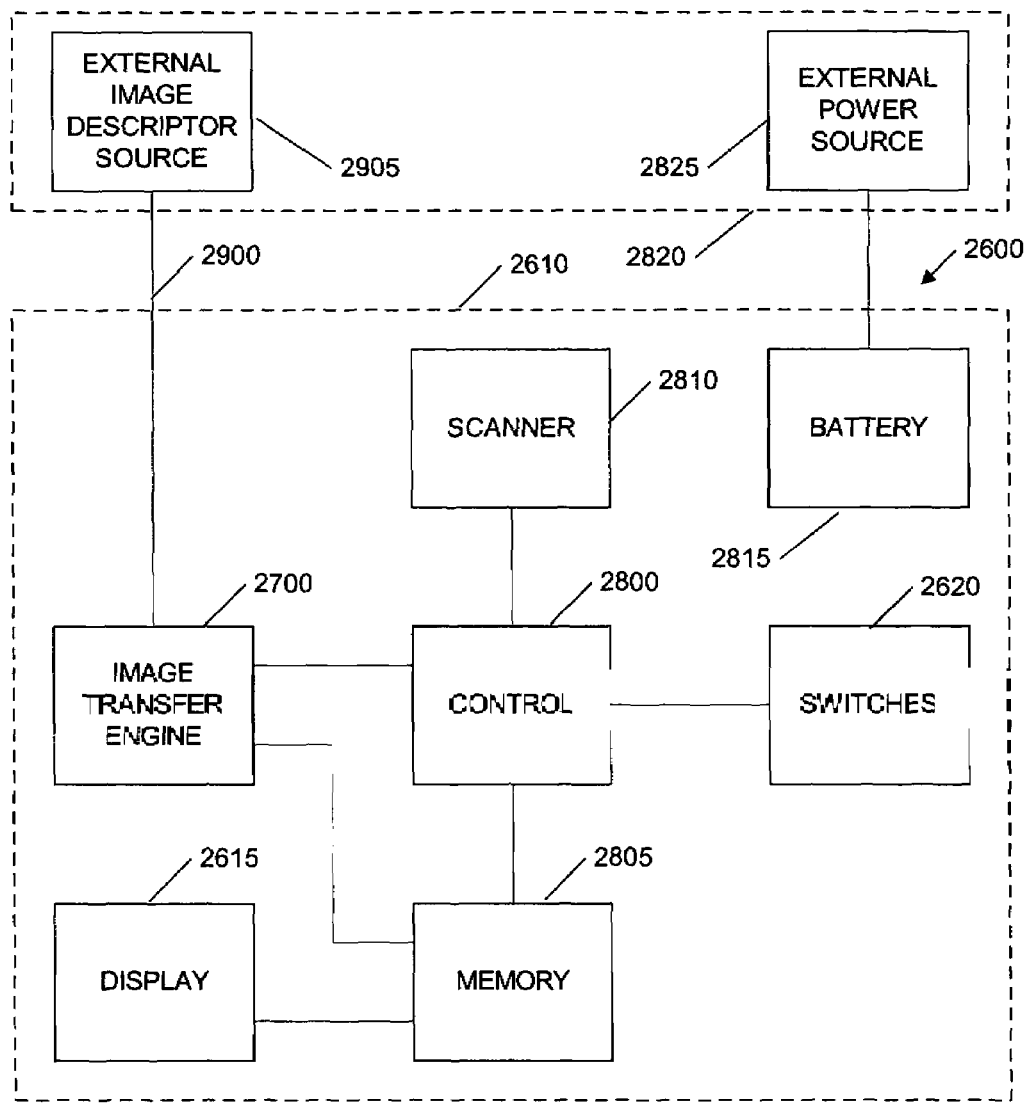
FIGURE_29

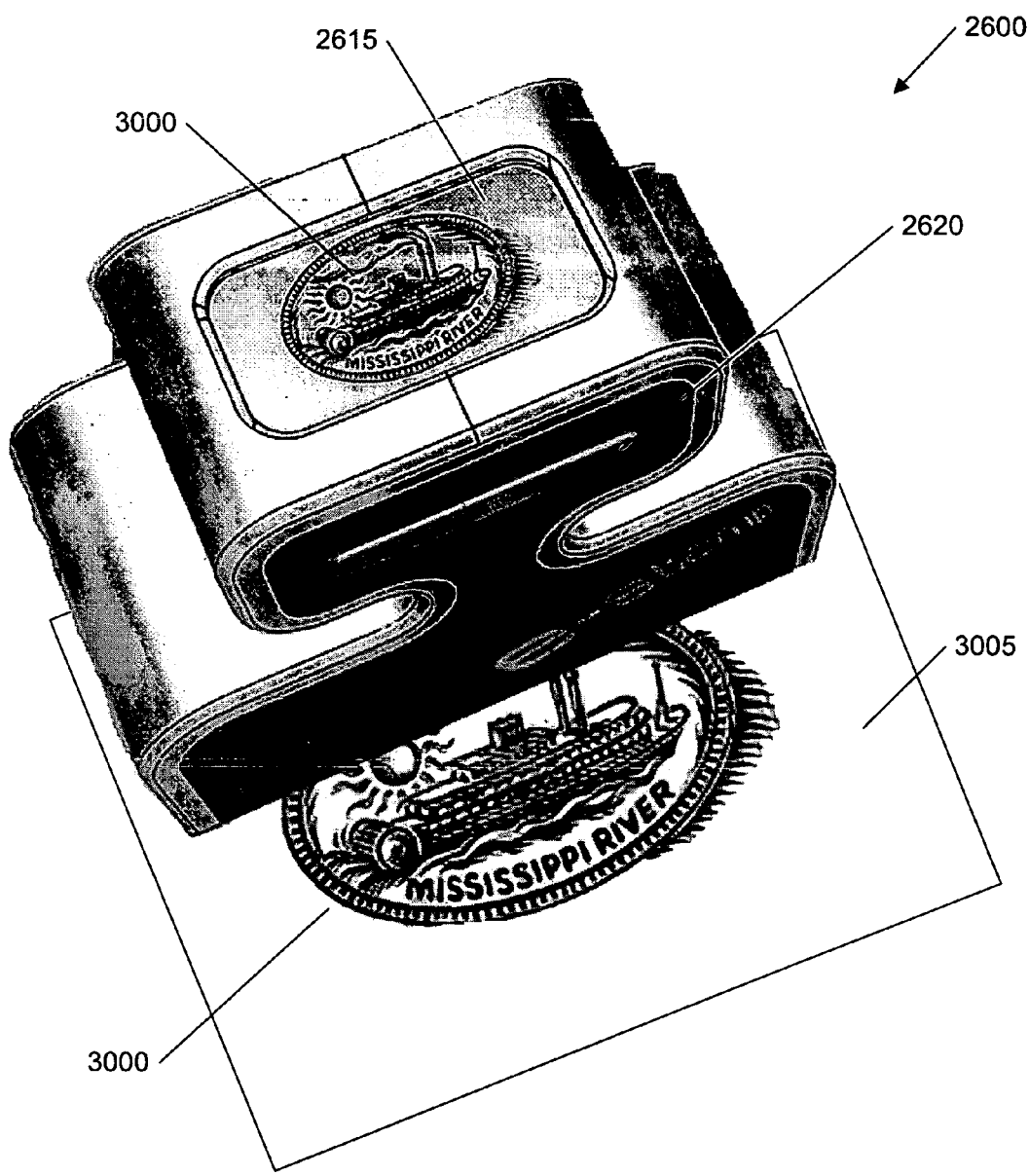
FIGURE_30

APPARATUS, METHOD, AND COMPUTER PROGRAM PRODUCT FOR PAD TRANSFER

CROSS_REFERENCE TO RELATED APPLICATIONS

The present application is a CONTINUATION-IN-PART of application Ser. No. 10/628,749 entitled APPARATUS AND METHOD FOR PAD PRINTING filed 28 Jul. 2003, and is related to both application Ser. No. 10/628,820 entitled "APPARATUS AND METHOD FOR IMAGE CAPTURE AND PAD TRANSFER" and application Ser. No. 10/628,750 entitled "APPARATUS AND METHOD FOR ANIMATION PAD PRINTING" both filed on 28 Jul. 2003; and is related to application serial No. 10/618,107 entitled Image Transfer System and Method, filed 10 Jul. 2003 and application Ser. No. 10/728,118 entitled "APPARATUS, METHOD, AND COMPUTER PROGRAM PRODUCT FOR ANIMATION PAD TRANSFER" and filed on even date herewith. These related applications are all hereby expressly incorporated by reference for all purposes.

BACKGROUND OF THE INVENTION

The present invention relates generally to image transfer systems, and more particularly to printing systems for transferring an image to a pad of transfer medium.

There are many types of printing systems available today. These systems include dot-matrix, thermal printers, electrostatic image transfer, ink ejectment, and the like. These systems are adapted for printing successive images on individual sheets of separate pages drawn from a paper reserve stack. There are many different mechanisms for extracting individual sheets and directing them to the image application portion of the printer. What these printers have in common is that the printing systems are adapted for accessing, controlling, routing and printing a single sheet at time.

Pads of note paper, such as Post-It® brand sticky note pads available from 3M Corporation of St. Paul, Minn., are well known. These pads include stacks of pages releasably secured to each other with a tacky adhesive that permits an individual page to removed from the pad and re-adhered to another surface. This feature of releasable securement to successive surfaces is a desirable trait of these products.

Currently to produce an image on a sticky note, a user either writes or otherwise applies some text or graphic element on the topmost page of the pad of sticky note. Later, the user removes the note to reposition it to the desired location. It would be advantageous to use a printing system to apply the element to the sticky note page. However, the current printing systems are incapable of printing on such a pad. 3M offers a solution for printing on a preformed matrix of single layer note pages arranged in a standard 8"×11" format for running through a conventional printer called a PRINTSCAPE™ Personalized Note Kit product. This product features a matrix of Post-it® Notes included on a sheet of six notes arranged in three rows of two columns. A sheet of notes is compatible with existing printers for designing individual note content on a PC and printing them as desired, much like label design and printing software.

This solution has disadvantages in that it requires access to, and use of, a full-size printer and associated computer system to reproduce the element on the note. Also, the user has to obtain pages of the special format, as well as special software for use in cooperation with the computer system operating the printer.

There are cameras designed for producing hardcopy facsimiles of images captured through an optical field-of-view. These cameras require a special package of film for producing instant hardcopy pictures. Examples include Polaroid instant cameras using instant film and peel-apart film. The instant film implements a self-developing process in which the image is captured and developed directly on the film and not transferred. Polaroid also makes an iZone camera that includes both digital "film" and a special version of instant film. Digital film records an image in onboard memory, and the image is later transferred to a separate machine (computer or special printer) to print hardcopies of desired images from the digital film. The instant film for the iZone develops a captured image directly on the film and includes a semi-tacky adhesive backing for temporary attachment of the picture to another surface. These solutions have the drawback that the instant cameras only provide instant images when used with instant film. The instant film is a specialty product that is not widely available, and has a cost that is not insubstantial.

Animation books are also known. An animation book includes a series of sheets of paper bound together. Each page has some image on it, with the collection of images related to each other to provide a sense of animation when the images are displayed successively. This effect is similar to motion picture technology in projecting many frames per second of one or more sets of related images.

Currently, quality animation books, or flip-books, are available commercially. It is known for an animator to hand apply sequenced images individually to sets of pages to produce a rudimentary animation book. However, such a solution does not produce animation books of sufficient quality, and the production is often limited to the animator's artistic skills. There are systems, including personal computers and software for generating animation sequences from images. But these sequences must be viewed on the computer system or converted into video/film presentations for later viewing.

Pre-inked rubber stamps are well-known in the art. This technology provides a text or graphic image carved or otherwise formed in an elastomeric body. By inking the body and pressing the body to a surface, the ink is transferred to the surface to form a facsimile of the text or graphic image. The technology includes many ways of applying ink uniformly and efficiently to the elastomeric body. Prior to pre-inked rubber stamps, rubber stamps were manually inked with a stamp pad, and prior to that, images were carved into hard materials (e.g., wood or metal) and an ink was applied for transfer to a surface.

These solutions offer a user an ability to reproduce preselected text/image facsimiles very simply, economically and repetitively. There are a few disadvantages to these devices, including the difficulty of adapting or modifying the preselected text/image. Each device is typically customized, with little ability for a user to modify the text/image requiring the user to obtain multiple devices, each with a different text/image.

A prior art solution to this disadvantage provides one or more user-selectable text/images or components of a text/image (e.g., an alphabet wheel or a number wheel) that allows a user to select one of several predefined text/images for reproduction.

This solution is acceptable as long as the desired text/image is available in the predefined set of text/images. When a user desires a text/image that is unavailable, a new device must be obtained. Thus, a user may require many different devices in order cover the range of desired text/images.

It is a second disadvantage that customizing a device most often results in some lead time between identifying a desired text/image and obtaining a device for reproducing the desired text/image. This disadvantage can result in fewer devices being used (because of the lead time disadvantage) and when a user opts to use devices of this class, many users have many extra devices that are seldom used. And because the devices are customized and generally unmodifiable, many devices are infrequently used before becoming obsolete and discarded.

SUMMARY OF THE INVENTION

The present invention includes apparatus and method for image transfer onto one of a plurality of a pad medium pages while the pages are aggregated together. A preferred embodiment for a printer includes a housing; a print engine, within the housing, for transferring an image to a transfer medium when the transfer medium is located at a print position; and a transfer medium registration system, coupled to the print engine, for positioning a pad including a plurality of transfer media releasably secured to one another, wherein the print registration system locates one of the transfer media at the print position. The method including positioning a pad at a print position of a print transfer engine, the pad including a plurality of transfer media releasably secured to one another; and transferring an image to one of the transfer media positioned at the print position.

The preferred embodiment of the present invention is provided as a stand-alone system for receiving a pad of a plurality of transfer media and for transferring an image to one of the transfer media. Additionally, the printer may be incorporated into a portable image capturing device to directly transfer a captured image onto the pad. The one transfer medium may be printed while attached, or in some implementations, after being stripped from the pad. In some implementations, a print registration system ejects a printed medium after printing, or a user removes the pad after printing, removes the printed medium, and then reinserts the pad. Virtually any image may be transferred, limited by the image transfer engine, the image source quality and pad size. Examples include maps, notes, photos, daily calendar with appointments, to-do items, shopping lists, checklists, and phone numbers.

The present invention includes apparatus and method for image transfer onto one of a plurality of a pad medium pages while the pages are aggregated together. A preferred embodiment for an image transfer system, including a housing; an image capture system, within the housing and coupled to the transfer engine, for producing an image; a transfer engine, within the housing, for transferring the image to a transfer medium when the transfer medium is located at a transfer position; a transfer medium registration system, coupled to the transfer engine, for positioning a pad including a plurality of transfer media releasably secured to one another, wherein the transfer registration system locates one of the transfer media at the transfer position. An image transfer method includes capturing an image using an image capture system within a housing; positioning a pad at a transfer position of a transfer engine inside the housing, the pad including a plurality of transfer media releasably secured to one another; and transferring the image to one of the transfer media positioned at the transfer position.

The preferred embodiment of the present invention is provided as a stand-alone system for receiving a pad of a plurality of transfer media and for capturing and transferring an image to one of the transfer media. The imaged transfer medium may be printed while attached, or in some implementations, after being stripped from the pad. In some implementations, a transfer registration system ejects a print medium after printing, or a user removes the pad after printing, removes the printed medium, and then reinserts the pad. Virtually any image from a scene may be captured and transferred, limited by the image transfer engine, the image source quality (e.g., a quality of the image capture system) and pad size.

The present invention includes apparatus and method for image sequence transfer onto one of a plurality of a pad medium pages while the pages are aggregated together. A preferred embodiment for a printer includes An image transfer apparatus, including a housing; an image transfer engine for transferring a series of images at a transfer position; and a transfer medium registration system for positioning a pad including a plurality of transfer media releasably secured to one another, wherein the transfer registration system locates a series of individual ones of the transfer media at the transfer position to receive different images of the series of images. The image sequence transferring method includes positioning a pad at a transfer position of a transfer engine, the pad including a plurality of transfer media releasably secured to one another; and transferring a series of images to successive ones of the transfer media serially positioned at the transfer position.

The preferred embodiment of the present invention is provided as a stand-alone system for receiving a pad of a plurality of transfer media and for transferring a series of images to successive ones of the transfer media. Additionally, the printer may be incorporated into a portable image capturing device to directly transfer a captured image sequence onto the pad. To form the animation book, the images are transferred to successive media while each element is attached, or in some implementations, individual elements are collected in proper order and bound together. In the preferred implementation, a transfer registration system positions the series of transfer media elements at a transfer position of the transfer engine. Virtually any sequence of images may be transferred (e.g., captured sequences, related sets of still images, or image sets developed from one or more reference images (e.g., "morphing"), limited by the image transfer engine, the image source quality and pad size.

These and other novel aspects of the present invention will be apparent to those of ordinary skill in the art upon review of the drawings and the remaining portions of the specification.

BRIEF DESCRIPTION OF THE DRAWINGS

FIG. 1 is a block perspective view a preferred embodiment of the present invention for a pad printing system;

FIG. 2 is a perspective view of the preferred embodiment implemented in a desktop printing system;

FIG. 3 is a perspective view of the preferred embodiment implemented in an image capture system;

FIG. 4 is a block perspective view a preferred embodiment of the present invention for a pad animation printing system;

FIG. 5 is a perspective view of an alternate preferred embodiment for a pad transfer system;

FIG. 6 is a perspective view of an alternate preferred embodiment for a pad transfer system;

FIG. 7 is a perspective view of an alternate preferred embodiment for a pad transfer system;

FIG. 8 is a perspective view of an alternate preferred embodiment for a pad transfer system;

FIG. 9 is a perspective view of an alternate preferred embodiment for a pad transfer system;

FIG. 10 is a perspective view of an alternate preferred embodiment for a pad transfer system;

FIG. 11 is a perspective view of an alternate preferred embodiment for a pad transfer system;

FIG. 12 is a perspective view of an alternate preferred embodiment for a pad transfer system;

FIG. 13 is a perspective view of an alternate preferred embodiment for a pad transfer system;

FIG. 14 is a perspective view of an alternate preferred embodiment for a pad transfer system;

FIG. 15 is a perspective view of an alternate preferred embodiment for a pad transfer system;

FIG. 16 is a set of views (a.–d.) for an alternate preferred embodiment of a roller/feeder/separator/extractor for use in a pad transfer system;

FIG. 17 is a view of an alternate preferred embodiment for a roller/feeder/separator/extractor for use in a pad transfer system;

FIG. 18 is a perspective view of an alternate preferred embodiment for a pad transfer system;

FIG. 19 is a view of an alternate preferred embodiment for a roller/feeder/separator/extractor 1900 for use in a pad transfer system;

FIG. 20 is a view of an alternate preferred embodiment for a roller/feeder/separator/extractor 2000 for use in a pad transfer system;

FIG. 21 is a set of views (a.–e.) for an alternate preferred embodiment of a roller/feeder/separator/extractor for use in a pad transfer system;

FIG. 22 is a view of an alternate preferred embodiment for a roller/feeder/separator/extractor for use in a pad transfer system FIG. 23 is a view of an alternate preferred embodiment for a roller/feeder/separator/extractor for use in a pad transfer system;

FIG. 24 is a perspective view of an alternate preferred embodiment for a pad transfer system using an extractor system similar to the extractor shown in FIG. 23;

FIG. 25 is a perspective block diagram of an imaging system;

FIG. 26 is a perspective view of a preferred embodiment for an imager with an image descriptor transfer system (e.g., a USB port and complementary USB plug communicated to an external image source);

FIG. 27 is a perspective view of an image transfer engine disposed in an image transfer region of a housing of the imager;

FIG. 28 is a block schematic diagram of an imager system;

FIG. 29 is an alternate preferred embodiment for a block schematic diagram of an imager system; and FIG. 30 is a top perspective view of the imager in operation.

DESCRIPTION OF THE SPECIFIC EMBODIMENTS

FIG. 1 is a block perspective view a preferred embodiment of the present invention for a pad transfer system 100.

Transfer system 100 includes a housing 105, an image transfer engine 110, a transfer registration system 115 for receiving a pad 120.

Housing 105 contains the elements of pad transfer system 100. Housing 105 preferably also may be integrated into other devices (either physically or logically) to provide functionality such, as for example, image capture, image storing, and/or image transmission. Pad transfer system 100 may also be enabled to work cooperatively with an image capture system, with the image capture system physically or logically integrated with pad transfer system 100.

Image transfer engine 110 is a device for applying a text or graphic element onto pad 120 when pad 120 is registered within transfer registration system 115. Image transfer engine 110 may include conventional printing systems such as, for example, a laser printer, an inkjet printer, a thermal printer, a dot-matrix printer, or the like. Image transfer engine 110 may include imaging systems like stenciling and stamping as well. Therefore image transfer engine 110 of the preferred embodiment denotes a system that imparts a perceptible image onto or into one of a transfer medium of pad 120, and the term print is used in a generic sense to include all such transfer processes.

In some implementations, image transfer engine 110 uses a printing system that consumes a print resource during the transfer process (e.g., toner in a laser printer or ink in an inkjet printer). Pad printing system 100 may provide for replaceable resource sources 125 (e.g., an ink cartridge or toner cartridge) or provide for replacement of a complete image transfer engine 110 that is new or refurbished with a fresh supply of the resource.

Pad printing system 100 includes a processing unit for controlling the functions, and includes memory for storing program instructions and, in some cases, images in a format suitable for use with image transfer engine 110. This memory may include portions that are volatile, non-volatile or some combination. In some implementations, pad printing system 100 includes one or more image access ports 130, coupled to the controller, memory, or directly to image transfer engine 110. Image access port 130 is a receiver/receptacle adapted to operatively mate with memory modules storing one or more images for application using pad printing system 100, or for coupling to another device or source of images, such as, for example, a computing system, a camera, a scanner, a video camera, or the like. Some implementations and embodiments of the present invention include rechargeable batteries to power the transfer functions. Access port 130 may be integrated into a docking station for receiving, storing, powering and otherwise interfacing to the image transfer system or to an image capture system, or both. The docking system may be used for systems lacking the rechargeable batteries.

In some implementations of the preferred embodiment, pad transfer system 100 includes a display 135 for reproducing a facsimile of an image to be transferred, or transferred by, image transfer engine 110. Display 135 also provides feedback during control or operation functions. A portion of display 135 provides feedback regarding the status of the image transfer process, such as that system 100 is ready to begin transfer, transfer is ongoing, and/or transfer has completed.

A control system 140 includes one or more buttons coupled to the controller for actuating an image transfer process, selecting an image for transfer, accessing images through access port 130. In the preferred embodiment, control system 140 includes a "PRINT" button, the actuation of which initiates an image transfer process.

Print registration system 115 receives pad 120 and positions one transfer medium of the plurality of transfer media at a location to cooperate with image transfer engine 110 in the image transfer process. Pad 120 of the preferred embodiment is a stack of uniformly sized transfer medium elements (e.g., sheets of paper, though other substrates or materials are possible, including Mylar film, decals, etc.) releasably secured to each other. In the preferred embodiment, pad 120 is a stack of sticky note pads, like the Post-It® sticky note pad product. Registration system 115 locates the topmost transfer medium at the print position and holds pad 120 during the image transfer process. In some implementations, no semi-tacky adhesive is used, pad 120 being a stack of sheets of medium, such as uniformly sized and weighted sheets of paper. It is understood that pad 120 for the present invention typically includes a standard set of uniformly sized sheets of paper, having a sheet count per set of ten or more sheets. The preferred embodiment of the present invention accommodates such sets of sheets (pads) for processing, though in some cases, the embodiments are able to process a single sheet. It is a feature of the preferred embodiments, as described herein and as described in the incorporated patent applications, that they are capable of operating on pad 120 as stacked, assembled, and bound.

In some embodiments, registration system 115 may position the bottommost transfer medium, or some other portion of pad 120. Registration system 115 may include an adapter/cartridge for holding pad 120 during image transfer. Such an adapter/cartridge is configurable to permit registration of different sized pads 120 (size differing in thickness and/or peripheral dimensions).

Registration system 115 also includes, in some implementations, a stripper 145 for pulling a single transfer medium off pad 120, either before image transfer or after. Stripper 145, depending upon its functions, may be implemented in numerous different ways. A simple implementation includes a blade or roller that slides between a sheet and the remainder of the pad to lift, separate and remove the sheet.

It is understood that pad print system 100 may also be implemented as a simple device without the display, access ports, and controls. When inserting pad 120 sufficiently far into registration system 115, image transfer begins. An LED is illuminated while the transfer process is in progress. When the LED extinguishes, pad 120 is removed with one of the pages bearing the transfer image.

In operation, a user loads pad 120 into registration system 115 that in turn locates one of the transfer medium at the desired location. A user selects a particular image for transfer, either from internal memory or from an external source through image access port 130. The selected image is viewed on display 135, and the user actuates the "PRINT" button to initiate the transfer system. When the transfer process is completed, the transfer medium, either individually or as part of pad 120, is removed from pad printing system 100.

FIG. 2 is a perspective view of the preferred embodiment implemented in a desktop printing system 200. Desktop printing system 200 is configured as shown in FIG. 1, including having two access ports 130 for accessing images: one coupled to an imaging system (e.g., a camera) and the other to a computing system. System 200 has two operating modes: vertical as shown that operates like a "toaster" and a horizontal mode (not shown) that operates as a "toaster oven."

FIG. 3 is a perspective view of the preferred embodiment implemented in an image capture/print system 300. System 300 is configured as shown in FIG. 1, and includes an image capture portion (e.g., camera, video camera or scanner). The camera includes a charge-coupled device (CCD) for collecting an image from a desired field-of-view, with the collected image stored into the memory or sent directly to image transfer engine 110 for transfer to pad 120. When the capture system is integrated into housing 105 as shown in FIG. 1, the memory and controller may be shared between the capture system and the pad transfer system. When physically distinct, access port 130 may transfer images from the capture system to the transfer system. When integrated, a "shutter" control of the image capture system may also initiate operation of the image transfer engine.

FIG. 4 is a block perspective view a preferred embodiment of the present invention for a pad transfer system 400. Transfer system 400 includes housing 105, image transfer engine 110, transfer registration system 115 for receiving a pad 120' similarly to system 100 shown in FIG. 1.

Housing 105 contains the elements of pad transfer system 400. Housing 105 preferably also may be integrated into other devices (either physically or logically) to provide functionality such, as for example, image capture, image processing/animation generation, image storing, and/or image transmission. Pad transfer system 400 may also be enabled to work cooperatively with an image capture system, with the image capture system physically or logically integrated with pad transfer system 400.

Image transfer engine 110 is a device for applying a text or graphic element onto pad 120' when pad 120' is registered within transfer registration system 115. Image transfer engine 110 may include conventional printing systems such as, for example, a laser printer, an inkjet printer, a thermal printer, a dot-matrix printer, or the like. Image transfer engine 110 may include imaging systems like stenciling and stamping as well. Therefore image transfer engine 110 of the preferred embodiment denotes a system that imparts a perceptible image onto or into one of a transfer medium of pad 120', and the term print is used in a generic sense to include all such transfer processes.

In some implementations, image transfer engine 110 uses a printing system that consumes a print resource during the transfer process (e.g., toner in a laser printer or ink in an inkjet printer). Pad printing system 400 may provide for replaceable resource sources 125 (e.g., an ink cartridge or toner cartridge) or provide for replacement of a complete image transfer engine 110 that is new or refurbished with a fresh supply of the resource.

Pad printing system 400 includes a processing unit for controlling the functions, and includes memory for storing program instructions and, in some cases, images in a format suitable for use with image transfer engine 110. This memory may include portions that are volatile, non-volatile or some combination. In some implementations, pad printing system 400 includes one or more image access ports 130, coupled to the controller, memory, or directly to image transfer engine 110. Image access port 130 is a receiver/receptacle adapted to operatively mate with memory modules storing one or more images for application using pad printing system 400, or for coupling to another device or source of images, such as, for example, a computing system, a camera, a scanner, a video camera, or the like. Some implementations and embodiments of the present invention include rechargeable batteries to power the transfer functions. Access port 130 may be integrated into a docking station for receiving, storing, powering and otherwise interfacing to the image transfer system or to an image capture system, or both. The docking system may be used for systems lacking the rechargeable batteries.

In some implementations of the preferred embodiment, pad transfer system 400 includes display 135 for reproducing a facsimile of an image sequence to be transferred to, or transferred by, image transfer engine 110. Display 135 also provides feedback during control or operation functions. A portion of display 135 provides feedback regarding the status of the image transfer process, such as that system 400 is ready to begin transfer, transfer is ongoing, and/or transfer has completed.

Control system 140' includes one or more buttons coupled to the controller for actuating an image transfer process, selecting an image or image sequence for transfer, accessing images through access port 130. In the preferred embodiment, control system 140' includes a "PRINT" button, the actuation of which initiates an animation transfer process.

Print registration system 115 receives pad 120' and positions a series of individual ones of transfer medium elements of the plurality of transfer media at a location to cooperate with image transfer engine 110 in the image transfer process. Pad 120' of the preferred embodiment is a stack of uniformly sized transfer medium elements (e.g., sheets of paper, though other substrates or materials are possible, including Mylar film, decals, etc.) secured to each other, preferably by edge-laminate-adhesive binding. In the preferred embodiment, pad 120' is a stack sheets of paper bound together to permit sheets to be easily moved out from the transfer position while remaining secured to pad 120'. In some embodiments, other stacks of print material may be used, including pad 120 used above. Registration system 115 locates the current transfer medium element at the print position and holds pad 120' during the image transfer process.

In some embodiments, registration system 115 may position the bottommost transfer medium, or some other portion of pad 120'. Registration system 115 may include an adapter/cartridge for holding pad 120' during image transfer. Such an adapter/cartridge is configurable to permit registration of different sized pads 120 (size differing in thickness and/or peripheral dimensions).

Registration system 115 includes a flipper 405 for separating and moving/repositioning a single transfer medium element of pad 120', either before image transfer or after. Flipper 405, depending upon its functions, may be implemented in numerous different ways. A simple implementation includes a blade or roller that slides between a sheet and the remainder of the pad to lift, separate and move the sheet.

It is understood that pad print system 400 may also be implemented as a simple device without the display, access ports, and controls. When inserting pad 120' sufficiently far into registration system 115, image transfer begins. An LED is illuminated while the transfer process is in progress. When the LED extinguishes, pad 120' is removed with one of the pages bearing the transfer image.

In operation, a user loads pad 120' into registration system 115 that in turn locates one of the transfer medium at the desired location. A user selects a particular image sequence for transfer, either from internal memory or from an external source through image access port 130. The selected image sequence is viewed on display 135, and the user actuates the "PRINT" button to initiate the transfer system. When the transfer process is completed, pad 120', is removed from pad printing system 400. Flipping the individual elements of pad 120 simulates animation according to the image sequence.

FIG. 5 is a perspective view of an alternate preferred embodiment for a pad transfer system 500 including a transferer 505 and a cartridge 510 for holding pad 120'. In this implementation, pad 120' is held and registered properly to transferer 505 by cartridge 510. Cartridge 510, in some implementations, is adaptable to varying sized (height, width, length) elements of pad 120'. For example, cartridge 510 biases pad 120' to a particular corner and provides a consistent physical interface to transferer 505. A transfer engine within transferer 505 typically transfers images with respect to the top-most pad element. However, in some cases, cartridge 510 is provided with media element control to select a desired element from pad 120'.

FIG. 6 is a perspective view of an alternate preferred embodiment for a pad transfer system 600. System 600 includes a transferer 605 having a pad receiving area 610 on a plane upon which pad 120' may be placed "face down." System 600 does not require indexing for variable height of pad 120'. Gravity or a biasing system holds pad 120' in place for image transfer.

FIG. 7 is a perspective view of an alternate preferred embodiment for a pad transfer system 700. System 700 includes a transferer 705 overlying a tower 710 holding pad 120'. Tower 710 is about a height of a full pad 120'. Weight of transferer 705 holds it in proper relation to pad 120'. During use, transferer 705 moves downward as pad elements are removed (manually or automatically) using system 700.

FIG. 8 is a perspective view of an alternate preferred embodiment for a pad transfer system 800. System 800 includes a transferer 805 incorporating a form-delivery cartridge 810 holding pad 120' in place using a biasing member 815 (e.g., a spring). In this embodiment, cartridge 810 is accessible via a drawer to add/remove pad 120'/element of pad 120' after processing.

FIG. 9 is a perspective view of an alternate preferred embodiment for a pad transfer system 900. System 900 includes a transferer 905 movably (e.g., hingedly, tiltably, pivotally, slidably or rotatably) coupled to a base 910 holding (directly or indirectly) pad 120'. Transferer 905 is moved into the transfer position for transferring (the movement is prior to the transfer or the movement transfers/initiates the transfer) an image onto pad 120'. The movement adapts printer to varying height of pad 120'. Pad 120' is available for other use when transferer 905 is moved away, such as for handwriting by a user.

FIG. 10 is a perspective view of an alternate preferred embodiment for a pad transfer system 1000. System 1000 includes a transferer 1005 for transferring an image to an element of pad 120' using a transfer medium (e.g., ink) ejected from a portion 1010 of an imaging engine. In the preferred embodiment, pad 120' is not indexed and the transfer medium spans the gap. In some cases, the gap increases, while in other implementations the gap is maintained within a desired threshold.

FIG. 11 is a perspective view of an alternate preferred embodiment for a pad transfer system 1100. System 1100 includes a transferer 1105 for transferring an image to an element of pad 120' and a display 1110 coupled to transferer 1105. Display 1110 provides a user with a WYSIWYG ("what you see is what you get") interface. In the preferred embodiment, display 1110 is an LCD having the same resolution (pixels/inch, color and color depth) as the transfer engine used in transferer 1105. In some implementations, display 1110 is also touch-sensitive, able to respond to control input received through manipulation of physical or virtual control elements. In one application, a user may use a stylus to create/edit images for transfer to pad 120'. In another application, system 1100 includes handwriting recognition. System 1100 may create legible text from a user's handwriting, it may upload information to another system or process for further processing (e.g., archiving) or it may recognize directives/commands for initiating scripts, macros or other programmatic control features.

In some implementations, in addition to handwriting recognition or in lieu of the handwriting recognition, system 100 includes voice-recognition. With voice recognition, system 1100 either transcribes spoken language and creates an image for transfer onto an element of pad 120' (it may present candidate text on display 1105 prior to transfer) or responds to spoken commands to control transfer features or to transfer content from another source. This implementation is particularly useful in a mobile configuration, such as in an automobile, where the user is able to create notes without diverting attention while driving. Phone numbers, street addresses, other miscellaneous notes are candidates for voice-recognition.

FIG. 12 is a perspective view of an alternate preferred embodiment for a pad transfer system 1200. System 1200 includes a transferer 1205 for transferring an image to an element of pad 120' and a drawer 1205 coupled to transferer 1205. In this embodiment, drawer 1210 moves into and out of transferer 1205. When drawer 1210 is out, pad 120' is accessible to a user, such as for conventional use. When drawer 1210 is in, pad 120' is registered with a transfer engine of transferer 1205. Drawer 1210 may be controlled manually or automatically.

FIG. 13 is a perspective view of an alternate preferred embodiment for a pad transfer system 1300. System 1300 includes a transferer 1305 for transferring an image to an element of pad 120' and a pad element extractor 1310. Extractor 1310 of the preferred embodiment includes two counter-rotating rollers (a leftmost is rotating clockwise) for separating a bottom-most laminar element. Similar to system 600 shown in FIG. 6, system 1300 has a pad receiving area 1315. There are a number of configurations of system 1300, depending upon use and extractor 1310. In a simple embodiment, extractor 1310 is simply a part of an imaging engine to transfer an image to an element of pad 120' (e.g., the bottom-most element) while permitting user access to a different element of pad 120' (e.g., the top-most element). In some implementations, extractor 1310 removes the desired element from pad 120' and uses the removed element in cooperation with the image transfer engine. In other implementations, extractor 1310 includes, in cooperation with the image transfer engine, a duplexing option to transfer images to both sides of the removed element.

FIG. 14 is a perspective view of an alternate preferred embodiment for a pad transfer system 1400. System 1400 includes a transferer 1405 for transferring an image to an element of pad 120' and a pad element extractor (not shown). In system 1400, extractor 1405 uses negative air pressure (e.g., vacuum) to lift and feed a free edge of an element of pad 120' for image transfer. In this implementation, the element is lifted and removed from pad 120'. However, is some implementations, such as for example for sequenced image transfer, extractor may simply lift and separate elements of pad 120'.

FIG. 15 is a perspective view of an alternate preferred embodiment for a pad transfer system 1500. System 1500 includes a transferer 605 for transferring an image to an element of pad 120' and an element release 1510. Transferer 605 may, depending upon implementation, have different placement locations, such as the two optional locations shown in FIG. 15. System 1500 receives pad 120' in an arced or bent configuration, which shape stores potential energy. One or more elements of pad 120' will, when permitted by release 1510, release the potential energy and move towards a more planar configuration. By appropriately controlling the arc of pad 120' and release 1510, individual elements are controllably separated from pad 120'. One position for transferer 605 transfers an image prior to release, and the other transfers an image after release. Individual elements are thus fanable. In some impLtementations, system 1500 includes a sequenced mode to flip through consecutive elements of pad 120', and when pad 120 has recorded thereon a suitable sequenced set of images, system 1500 will "playback" the sequenced images.

FIG. 16 is a set of views (a.–d.) for an alternate preferred embodiment of a roller/feeder/separator/extractor 1600 for use in a pad transfer system. Extractor 1600 includes a movable rotating element that contacts a free-end (i.e., opposite of bound edge) of a top or bottom element of pad 120. Extractor 1600 moves from the free end to the bound end as it rotates. View 16*a* illustrates extractor 1600 about to contact a top element of pad 120'. View 16*b* illustrates the top element begin to "scrunch" or compress/bend to cause a middle portion to begin to bow out. View 16*c* illustrates that as extractor 1600 continues to move towards the bound end. The top element eventually separates from pad 120'. Extractor 1600 is between the top element and the remainder of pad 120' in view 16*c*, and has thus separated the top element. To remove the top element, extractor 1600 moves over pad 120' past the bound edge as shown in view 16*d*. When the binding uses a semi-tacky or readhering binding, the top element becomes releasably secured to the rotating element of extractor 1600 and is further processed depending upon the particular implementation. In some implementations, extractor 1600 will only separate elements (such as for sequenced image or animation image transfer) and not separate the elements of pad 120'.

FIG. 17 is a view of an alternate preferred embodiment for a roller/feeder/separator/extractor 1700 for use in a pad transfer system. Similar to a configuration shown in FIG. 15, extractor 1700 places pad 120' into a reverse arc (as compared to the arc shown in FIG. 15) and includes a moving rotating element 1705 to contact an element of pad 120' along a free edge. Extractor 1700 separates/extracts the element being processed under tension in contrast to the embodiment of FIG. 15. There are instances in which transfer or other processing options prefer the processed pad element to be under tension, and extractor 1700 provides one such solution.

FIG. 18 is a perspective view of an alternate preferred embodiment for a pad transfer system 1800. System 1800 includes a transferer 1805 for transferring an image to an element of pad 120' and a roller/feeder/separator/extractor 1810 such as shown in FIG. 17. System 1800 is a "peel back" system that captures an element of pad 120' and registers it to transferer 1805 for image transfer. After image transfer, system 1800 typically removes the pad element and ejects it after image transfer.

FIG. 19 is a view of an alternate preferred embodiment for a roller/feeder/separator/extractor 1900 for use in a pad transfer system. Extractor 1900 is an alternate mechanism for separating elements of pad 120' Extractor 1900 includes an element 1905 (e.g., a "finger") that contacts a free-edge and moves laterally towards a bound edge of pad 120'.

FIG. 20 is a view of an alternate preferred embodiment for a roller/feeder/separator/extractor 2000 for use in a pad transfer system. Extractor 2000 illustrates use of positive and negative air pressure, and in some implementations a combination of both pressures, to separate elements of pad 120'.

FIG. 21 is a set of views (a.–e.) for an alternate preferred embodiment of a roller/feeder/separator/extractor 2100 for use in a pad transfer system. Extractor 2100 includes a movable element (not necessarily rotating as compared to the element in FIG. 16) that contacts a free-end (i.e., opposite of bound edge) of a top or bottom element of pad 120. Extractor 2100 moves from the free end to the bound end as it rotates. View 21a illustrates extractor 2100 about to contact a top element of pad 120'. View 21b illustrates the top element begin to "scrunch" or compress/bend to cause a middle portion to begin to bow out. View 21c illustrates an pronounced bowing. View 21d illustrates that as extractor 2100 continues to move towards the bound end, the top element eventually separates from pad 120'. Extractor 2100 is between the top element and the remainder of pad 120' in view 21d, and has thus separated the top element. To remove the top element, extractor 2100 moves over pad 120' past the bound edge as shown in view 21e. When the binding uses a semi-tacky or readhering binding, the top element becomes releasably secured to the element of extractor 2100 and is further processed depending upon the particular implementation. In some implementations, extractor 2100 will only separate elements (such as for sequenced image or animation image transfer) and not separate the elements of pad 120'. Views 21a.–21e. demonstrate a consistent motion of elements of pad 120' to extractor 2100. this consistent motion is useable in image transfer systems, including those embodiments, implementations and applications set forth herein.

FIG. 22 is a view of an alternate preferred embodiment for a roller/feeder/separator/extractor 2200 for use in a pad transfer system. Extractor 2200 deposits or otherwise provides opposite charges on the free edges of elements of pad 120' to separate and "fan" the individual elements for processing.

FIG. 23 is a view of an alternate preferred embodiment for a roller/feeder/separator/extractor 2300 for use in a pad transfer system. Extractor 2300 includes an extractor element 2305 having a "tacky" region to remove elements from pad 120'. Element 2305 may be used to remove elements, or in some cases, it may additionally or in lieu of, apply tacky substances to elements of pad 120'.

FIG. 24 is a perspective view of an alternate preferred embodiment for a pad transfer system 2400 using an extractor system similar to extractor 2300 shown in FIG. 23. Transfer system 2400 includes a transferer 2405 having a "tacky" region/element 2410, with transferer 2405 moveable relative to pad 120' similar to transferer 905 shown in FIG. 9.

FIG. 25 is a perspective block diagram of an imaging system 2500. Imaging system 2500 includes a pad transfer system 2505, such as those described herein or in one of the incorporated patent applications. In addition, system 2500 includes a first communications device 2510 and a second communications device 2515 intercoupled by a communications cloud 2520. While the communications devices are shown as cellular telephones, other communications devices are encompassed within the scope of the present invention. For example, personal digital assistants (PDAs), tablet PCs, notebook computers, pagers, and other portable electronic devices are expressly included. In some implementations, plain old telephone service (POTS) telephones are also included.

The elements of system 2500 are all linked to each other, either directly or indirectly. Data and control signals of the preferred embodiment are communicated through these linkages, and may be any of the numerous types of wired and wireless communications systems. For example, Firewire, Serial, Parallel, WiFi, Ethernet, Bluetooth, IR, 802.11a/b/g, ultra-wideband, Token Ring, POTS, cellular network, voice, audio, code, electro-acoustic or other communication systems and the like, including other protocols may be used, whether now known or later developed. All the elements may use the same protocol or each link may be implemented with one or more additional/different protocols. In some instances, the communications link may be accomplished using a proprietary protocol.

System 2500 typically includes at least two users: one for device 2510 and one for 2515. It is a feature of system 2500 that either user may provide information/data to pad transfer system 2505. Device 2505, being more directly linked to transfer system 2505 transfers image data as described herein, and as described in the incorporated patent applications. There are instances in which a user of device 2515 desires to send information (e.g., provide a street address, a telephone number or a shopping list) to the user of device 2510, but it is inconvenient for the user of 2510 to transcribe the information. Such as when the user is "mobile" as in an automobile or otherwise outside the home or office. Providing pad transfer system 2505 with remote communications capabilities and portability, through any of the modalities expressly or implicitly set forth, provides both users with improved functionality.

FIG. 26 is a perspective view of a preferred embodiment for an imager 2600 with an image descriptor transfer system 2605 (e.g., a USB port and complementary USB plug communicated to an external image source). Imager 2600 includes a housing 2610 containing a display 2615, one or more switches 2620, and an image transfer engine proximate an image transfer region of housing 2610 as shown in FIG. 27 below.

Image descriptors are definitions used by the image transfer engine to generate a pattern with respect to a surface proximate the image transfer region, and include static as well as dynamic protocols. A static definition includes a complete rendering of the descriptor prior to transfer, while a dynamic definition builds a pattern during the course of the image transfer, such as streaming components of the definition to the transfer engine. A memory inside housing 2610 stores both a collection of predefined image descriptors as well as a collection of user image descriptors transferred into the memory using image transfer system 2605. While the preferred embodiment of imager 2600 uses a USB communication channel to transfer a set of user image descriptors into the memory from an external image source (the set including one or more, other transfer systems may be used depending upon the application and image descriptor. For example, Firewire, Infrared or Serial, BlueTooth, wireless fidelity (WIFI), TCP/IP or other communications system may be used to transfer the set of user image descriptors.

Housing 2610 is a portable hand-held container that is, in the preferred embodiment, reminiscent of a traditional self-inking rubber stamp in size and general character. Housing 2610 is preferably lightweight and easily portable and maneuverable to place the image transfer region proximate a surface to be patterned. The surface may be horizontal, vertical, or other angle.

Display 2615 in the preferred embodiment is a liquid crystal display (LCD) used for previewing a pattern for selection and/or transfer. Additionally, display 2615 may include functionality for presenting control or status information (and in some implementations of receiving control input) of imager 2600 or its subsystems like memory or transfer image condition. In some applications, display 2615 may be one or more indicators, arranged singly, in an array or a matrix. In some implementations, imager 2600 may have a transfer period associated with transferring an image to a surface. Display 2615 may include an indicator for signaling expiration of the transfer period.

Switch 2620 of the preferred embodiment issues one or more signals depending upon a particular configuration. In the preferred embodiment, switch 2620 is a transfer button that initiates transfer of a selected pattern to a surface when activated. In other applications, a transfer initiation function may be actuated by a pressure sensor or other mechanism, such as for example to detect when housing 2610 is pressed to a surface for image transfer. In some implementations, switch 2620 includes a data entry keypad for entering text or control parameters. The keypad may include a four-way switch for example that provides functionality to enter a text message image descriptor into imager 2600 for transfer or patterning. The image transfer system 2605 may provide a set of standard fonts or character library that is selected by use of the data entry keypad. For example, imager 2600 may include a US-ASCII character set in memory, which may be supplemented and/or replaced using another character set, including non-Latin character sets such as Kanji, Hiragana, Katakana or other pictograph language or image set. The character sets may be purely symbolic for constructing desired images using the keypad system. Additionally, the keypad system permits character, word and phrase formatting features to be applied to an image. For example, bold, italic, underline options could be applied, a justification option selected (e.g., centering, left justification or right justification), and a font size.

Switch 2620 may have an alternate or additional function. In some applications, a memory of imager 2600 may include two or more image descriptors and switch 2620 facilitates user selection of a desired one of the image descriptors. In other applications, switch 2620 may be activated by application of imager 2600 proximate the surface. Switch 2620 may be configured to automatically change all or a part of the image descriptor for each transferred image, or for a set of images. For example, image descriptors may include a standard return address, and a series of addresses, with switch 2620 cycling between the return address and a new address upon each application. Alternatively, an electronic Bates-type stamp may be configured for successively incrementing a number associated with each image transfer.

FIG. 27 is a perspective view of an image transfer engine 2700 disposed in an image transfer region 2705 of housing 2610 of imager 2600 shown in FIG. 26. Image transfer image 2700 may use any of several well-known image transfer processes to place an image upon, in, or under a surface. The specific type of transfer process is dependent upon the particular application, but may include ink ejection (e.g., ink jet or bubble jet), thermal transfer, electrostatic transfer, engraving, etching, adhering, stenciling or other image reproduction system adapted for operation within the relatively small size of housing 2610. In some instances, image transfer engine 2700 operates on, in, or under virtually any receiving surface, while in other applications image transfer engine 2700 operates in cooperation with a specially prepared surface or surface treatment.

Some image transfer processes are operable while imager 2600 is applied to a relatively flat portion of the surface, while other transfer processes permit successful transfer while juxtaposed proximate an irregular or uneven surface. This is contrasted with many prior art stamping systems that often produce undesirable or unacceptable results on irregular or uneven surfaces.

Housing 2610 defines an image transfer region 2705 that in the preferred embodiment is an aperture on a bottom side. The aperture is configured to work cooperatively with image transfer engine 2700 to permit access to the surface to be patterned while inhibiting contamination or damage to the engine. In some implementations, the aperture is provided with a high friction element (e.g., an elastomer surrounding the aperture for contact with the patterning surface) to limit movement of imager 2700 during image transfer.

FIG. 28 is a block schematic diagram of imager 2600. Imager 2600 includes the components described in FIG. 26 and FIG. 27—image transfer system 2605, housing 2610, display 2615, one or more switches 2620, and image transfer engine 2700. In addition, imager 2600 includes a controller 2800, a memory 2805, an optional scanner/image capture system 2810, and a rechargeable battery 2815 powering imager 2600 components. Part of the preferred embodiment for imager 2600, though not included within housing 2610, is a docking station 2820 that includes a recharger 2825 and may include an external image descriptor source 2830, or a connection to an external image descriptor source.

Control 2800 is coupled to memory 2805, scanner 2810, transfer port 2605, switch 2620, and image transfer engine 2700. In some applications, control 2800 may be additionally coupled to display 2615. Control 2800 is a suitably programmed special purpose processor operating based upon code instructions included in a nonvolatile portion of memory 2805 that coordinates the functions of imager 2600.

Memory 2805 stores one or more image descriptors, and it is these image descriptors that the image transfer engine uses to generate a desired pattern. In the preferred embodiment, the image descriptors are stored in nonvolatile memory, though other applications may store all or a portion of the image descriptors in volatile memory. In applications having many different patterns that are infrequently used, volatile memory may be sufficient particularly when image transfer system 2605 is available. Memory 2805 may also store image descriptors in a combination of volatile and nonvolatile memory. Memory 2805 may additionally include status and management information.

The image descriptors stored in memory may vary from application to application, depending upon several factors including the type of image transfer engine 2700. Image descriptors may be bitmaps of a pattern to be transferred, or it may be a vector description, or other format as well-known in the art. In some cases, the image descriptor may be a positive image, or a negative image, of the transfer pattern.

Scanner 2810 is an optional image/video capture system, such as for example, a CCD imaging system, though other image capture system may be used. Scanner 2810 provides a mechanism to capture one or more image descriptors to be used as transfer patterns with imager 100. When scanner 2810 is used to capture a series of successive images, control 2800 may optionally select appropriate successive image descriptors upon each activation to reproduce all or a portion of the series on one or more surfaces. Imager 2600 by use of scanner 310 is able to capture a series of related patterns and reproduce individual ones of the patterns or the series of patterns.

Docking station 2820 includes recharger 2825 for recharging battery 2815 when imager 2600 is docked. Docking station 2820 optionally includes image descriptor source 2830 (or a connection to such a source provided in a portable electronic device such as, for example, a personal computer, a PDA, a tablet PC, a cellphone, a telephone, inventory scanner, point-of-sale (POS) terminal, or video game.) Docking station 2820 may initiate image descriptor transfer automatically when imager 2600 is docked, or upon manual actuation depending upon the particular implementation.

External image descriptor source 2830 includes a repository for one or more image descriptors that a user desires to use with imager 2600. The repository may be a personal computer, network server, Internet database, or in some cases, a catalog of images that may be transferred via optical or other communications systems. The form of the repository and of the image descriptors will be dependent upon image transfer engine 2700 and in some cases by the image transfer system 2605.

FIG. 29 is an alternate preferred embodiment for a block schematic diagram of an imager system 2600. In the embodiment shown in FIG. 29, imager 2600 uses an alternate image transfer system 2900 and operates in cooperation with docking station 2820. Docking station 2820 includes an alternate external image descriptor source 2905 for forming an appropriate image to be applied onto image transfer engine 2700. For example, image descriptor source may produce a mirror-image of the desired image to be transferred and releasably applied onto a surface of engine 2700.

In this embodiment, transfer engine may include a transfer surface that is naturally highly non-wettable or non-stick relative to the imaging medium (e.g., ink) yet can be controllably altered to retain the image until transfer is complete. One such transfer system is to alter the transfer surface using static electricity or magnetic fields cooperating with the imaging medium to hold the image onto the transfer surface until the image is transferred. In this system, a desired image is constructed on the transfer surface (directly using the engine or indirectly by electrostatic charge deposition onto the transfer surface), the imaging medium is applied (e.g., ink in solid, liquid or gaseous form) and the image is transferred. In some cases such as the electrostatic image system, transfer engine 2700 may reverse a charge polarity of the transfer surface to aid in the image transfer.

FIG. 30 is a top perspective view of imager 2600 in operation. Imager 2600 has transferred a pattern 3000 onto a surface 3005 in response to a user juxtaposing image transfer region 2705 (shown in FIG. 27) to surface 3005 and selecting and approving a preview of the transfer pattern in display 2615 prior to activating switch 2620 to initiate a transfer process of image transfer engine 2700.

As used herein, pad 120 includes collections of print media not only secured to each other using a semi-tacky re-attachable adhesive (e.g., Post-It® notes) but also to releasable securement systems such as edge-applied adhesive laminate and other binding systems that hold the media together while permitting one or more medium elements to be detached.

In the preferred embodiment, pad 120 is two or more similarly sized laminar elements co-bonded (by individual adhesive between the sheets or by an edge bonding (like perfect binding)). In some instances, like the 3M Printscape product, a dual-ply print medium is passed through a laser printer imaging path. This is not a pad. Laser printers are designed for a single element (and will accept multiple elements if they may be processed as a single sheet), while the present invention is designed to handle a print medium that includes multiple similarly sized sheets. The embodiments of the present invention are adaptable for pads having three to ten, or more similarly sized sheets. Generally, any number of transfer medium sheets, of any weight, may be processed using the present invention, and while present invention may still be functional to print on pads having one or two sheets, this is not the intended use. Media composition/weight is particularly important for animation pads to have the correct flipping and operational considerations. Paper of traditional pads of prior art Post-it® Notes are generally too thin/light-weight for preferable animation pad use, though they may be used in some implementations. In some implementations, such as a "camera"application, pad 120' may desirably include photo-finished laminar elements, such as glossy or semi-glossy elements, bound together into pad 120'

In some instances, it may be desirable to assemble the pad from individual laminar elements. For example, media (sheets or rolls of desired weight paper) may be prepared for processing using the present invention, with a pad assembled/manufactured at the time of image transfer, or afterwards. It is believed that manufacture of custom Post-it® Notes involves commercial printing off of rolls of paper, a die-cutting process, an adhesive applying process, and an assembly process, though details of the process are generally unavailable. In an alternate preferred embodiment, appropriately sized laminar elements (e.g., sheets of pad 120) are individually imaged and assembled. The assembly may be by exposing a pre-applied adhesive (semi-tacky or "permanent") from the sheets and "stacking" the elements to form the pad. In some implementations, it is desirable to "bind" the individual sheets for advantageous animation pad use. For example, in addition to the "perfect binding" discussed above, in some cases the laminar elements are stacked and a spine-binding material is overlapped over a portion of one edge to "hingedly" couple the individual elements together.

The adhesive may be exposed by removing a protective overlayer (e.g., peeling a Mylar strip or melting/dissolving a coating, for example melting a "waxy" coating using heat from a fuser roll in the transfer engine.) In some cases, the image transfer engine may be adapted/synchronized to protect the adhesive (whether exposed or protected). A region on the fuser roll or other transfer engine element is adapted to protect/apply the adhesive as it moves through the image transfer process. The particular type of protection/application dependent upon the image transfer engine.

It is a feature of the present invention that features of the embodiments described herein may be shared, such as between the pad transfer systems and the imagers. For example, content is compatible and may be shared between imagers and transfer systems using virtually any communications protocol. For example, an image captured using a pad transfer system may be sent to an imager for transfer. Features such as interface elements, memory, etc. are typically interchangeable among the systems.

One of the preferred implementations of the present invention is as a routine in an operating system made up of programming steps or instructions resident in a memory of a computing system shown in FIG. 2, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed is:

1. An image transfer apparatus, comprising:
    a memory;
    an image transfer engine disposed proximate a transfer registration system including a pad of a plurality of laminar elements and a stripper wherein said plurality of laminar elements are releasably bound together to produce said pad, said transfer registration system positions one of said laminar elements at an image transfer location, and said stripper cooperates with said pad while said one laminar element is positioned at said image transfer location; and
    a control system, coupled to said memory and to said image transfer engine, for transferring an image in said memory onto at least one laminar element.

2. The apparatus of claim 1 wherein said plurality includes at least ten laminar elements.

3. The apparatus of claim 1 wherein said plurality of laminar elements are bound together along a binding edge.

4. The apparatus of claim 3 wherein said stripper includes an extractor for separating an individual laminar element from said pad.

5. The apparatus of claim 4 wherein said extractor separates said individual laminar element from said pad without detaching said individual laminar element from said pad.

6. The apparatus of claim 4 wherein said extractor uses an air pressure differential to separate said individual laminar element.

7. The apparatus of claim 4 wherein said extractor uses electrostatic charge differential to separate said individual laminar element.

8. The apparatus of claim 4 wherein said extractor includes a moving element contacting and bowing said individual laminar element to separate said individual laminar element.

9. The apparatus of claim 8 wherein said moving element includes a rotating member.

10. The apparatus of claim 4 wherein said extractor includes a moveable member having a tacking region.

11. The apparatus of claim 1 wherein said pad is located in an orientation to expose a first laminar element of said plurality of laminer elements to said image transfer engine.

12. The apparatus of claim 11 wherein said stripper includes an extractor for selecting a second of said laminar elements different from said first laminar element while said first laminar element is exposed.

13. The apparatus of claim 1 wherein said pad is registered in a cartridge and said image transfer engine images a laminar element while said laminar element is registered in said cartridge.

14. The apparatus of claim 13 wherein said cartridge is incorporated into a moveable drawer having an open position to expose a laminar element of said pad, and a closed position to present said pad in operation relationship to said image transfer engine for an image transfer process.

15. The apparatus of claim 1 wherein said image transfer engine is provided in a moveable member having a closed position for image transfer and an open position exposing said pad.

16. The apparatus of claim 1 further comprising a display for presenting said image to be transferred.

17. The apparatus of claim 16 wherein said display is interactive with a member to modify said image to be transferred.

18. The apparatus of claim 17 further comprising a handwriting recognition function for said control system.

19. The apparatus of claim 1 further comprising a voice recognition function for said control system.

20. The apparatus of claim 1 further comprising a first communications device communicated to said memory for providing a content of said image to be transferred.

21. The apparatus of claim 20 further comprising a second communications device communicated to said first communications device, for communicating said content to said first communications device.

22. An image transfer method, the method comprising:
    receiving a voice input at a pad transfer system having; an image transfer engine adapted for transferring an image to a laminar element of a pad, a transfer registration system for receiving said pad and positioning said laminar element at an image transfer location, and a stripper for cooperating with said pad while said laminar element is positioned at said image transfer location, said pad including a plurality of bound laminar elements; and
    responding to said voice input to control said image transfer engine.

23. The method of claim 22 wherein said responding step converts said voice input into image text for transfer.

24. The method of claim 22 wherein said responding step converts said voice input into one or more control directives for said image transfer engine.

25. A computer program product comprising a computer readable medium carrying program instructions for transferring an image using a pad transfer system when executed using a computing system, the executed program instructions executing a method, the method comprising:
    receiving a voice input at a pad transfer system having an image transfer engine adapted for transferring an image to a laminar element of a pad, a transfer registration system for receiving said pad and positioning said laminar element at an image transfer location, and a stripper for cooperating with said pad while said laminar element is positioned at said image transfer location, said pad including a plurality of bound laminar elements; and
    responding to said voice input to control said image transfer engine.

26. The computer program product of claim 25 wherein said responding step converts said voice input into image text for transfer.

27. The computer program product of claim 25 wherein said responding step converts said voice input into one or more control directives for said image transfer engine.

* * * * *